(12) United States Patent
Oishi et al.

(10) Patent No.: US 11,740,317 B2
(45) Date of Patent: *Aug. 29, 2023

(54) COMMUNICATION DEVICE AND NON-TRANSITORY COMPUTER READABLE STORAGE MEDIUM

(71) Applicant: KABUSHIKI KAISHA TOKAI RIKA DENKI SEISAKUSHO, Aichi (JP)

(72) Inventors: Yoshiki Oishi, Aichi (JP); Satoshi Mori, Aichi (JP); Kenichi Koga, Aichi (JP); Tatsuya Koike, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 45 days.

This patent is subject to a terminal disclaimer.

(21) Appl. No.: 17/354,262

(22) Filed: Jun. 22, 2021

(65) Prior Publication Data

US 2022/0057472 A1 Feb. 24, 2022

(30) Foreign Application Priority Data

Aug. 20, 2020 (JP) .................. 2020-139210

(51) Int. Cl.
*H04W 24/10* (2009.01)
*G01S 5/02* (2010.01)
*H04W 4/40* (2018.01)
(52) U.S. Cl.
CPC ............ *G01S 5/021* (2013.01); *G01S 5/0284* (2013.01); *H04W 4/40* (2018.02); *H04W 24/10* (2013.01)

(58) Field of Classification Search
CPC .......... G01S 5/021; G01S 5/0284; G01S 3/04; G01S 5/0218; G01S 11/02; G01S 3/46; G01S 5/0244; G01S 5/12; G01S 13/765; H04W 4/40; H04W 24/10; H04W 4/023; H04W 64/006; H04W 48/18; H04W 4/02
See application file for complete search history.

(56) References Cited

U.S. PATENT DOCUMENTS

2011/0076975 A1* 3/2011 Kim .................... G01S 5/14
455/226.1
2011/0267234 A1* 11/2011 van Puijenbroek ... H04W 64/00
342/387

(Continued)

FOREIGN PATENT DOCUMENTS

WO 2015/176776 11/2015

*Primary Examiner* — Marcus Hammonds
(74) *Attorney, Agent, or Firm* — Greenblum & Bernstein, P.L.C.

(57) ABSTRACT

A communication device comprising: a plurality of wireless communication sections; and a control section configured to control a repetition process of repeatedly performing a measurement process, on a basis of a reliability parameter calculated through the measurement process, and control a selection process of selecting a representative wireless communication section each time the measurement process is repeated in the repetition process, the measurement process including transmission of a signal from the representative wireless communication section, reception of the signal by the plurality of wireless communication sections, and calculation of the reliability parameter with regard to at least any of the wireless communication sections.

14 Claims, 21 Drawing Sheets

(56) References Cited

U.S. PATENT DOCUMENTS

| | | | |
|---|---|---|---|
| 2019/0053013 A1* | 2/2019 | Markhovsky | H04L 43/0864 |
| 2019/0349280 A1* | 11/2019 | Zhang | H04W 84/12 |
| 2020/0116817 A1* | 4/2020 | Chuo | H04L 27/2627 |
| 2021/0258085 A1* | 8/2021 | Oishi | H04B 17/27 |
| 2022/0061019 A1* | 2/2022 | Oishi | H04W 4/02 |
| 2022/0239386 A1* | 7/2022 | Oishi | H04B 17/318 |

* cited by examiner

FIG. 13
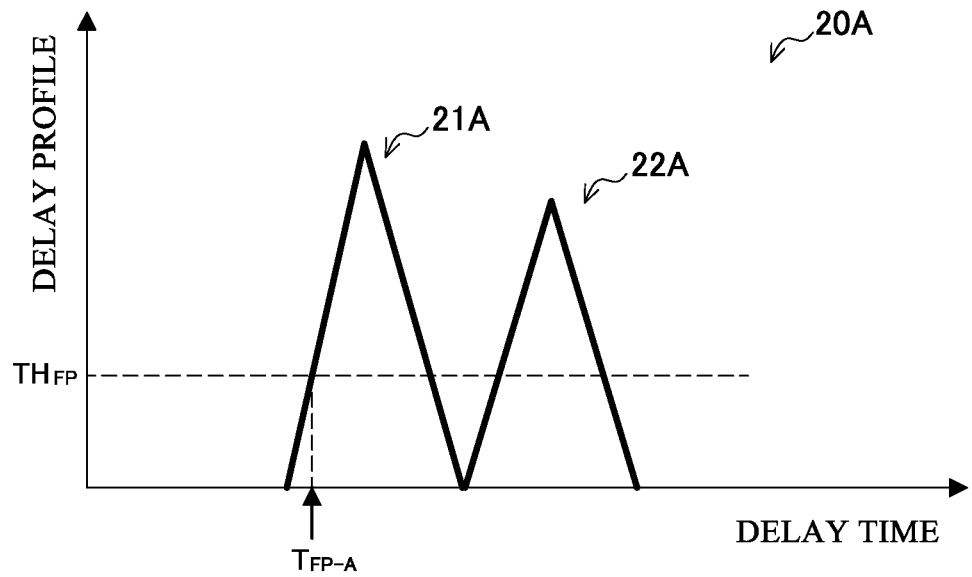
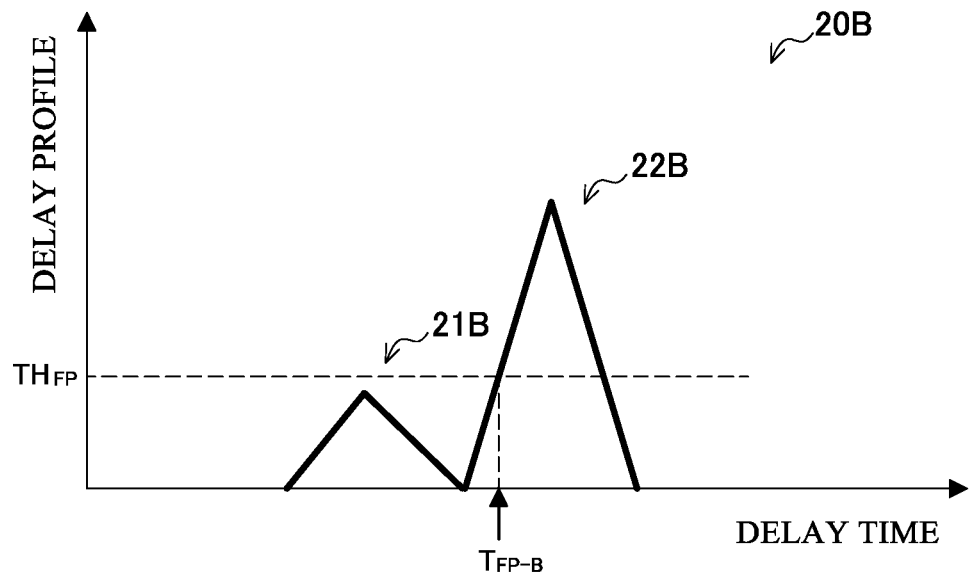

FIG. 14
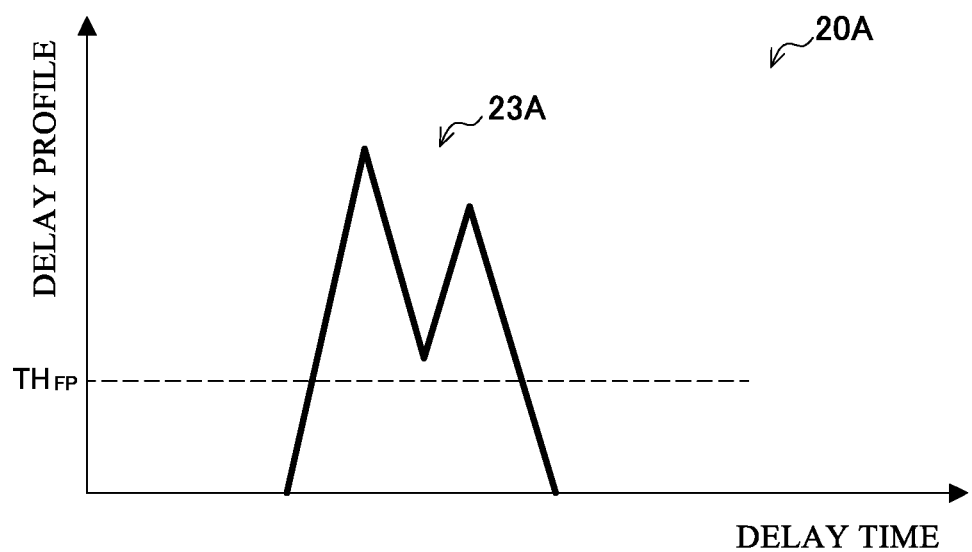
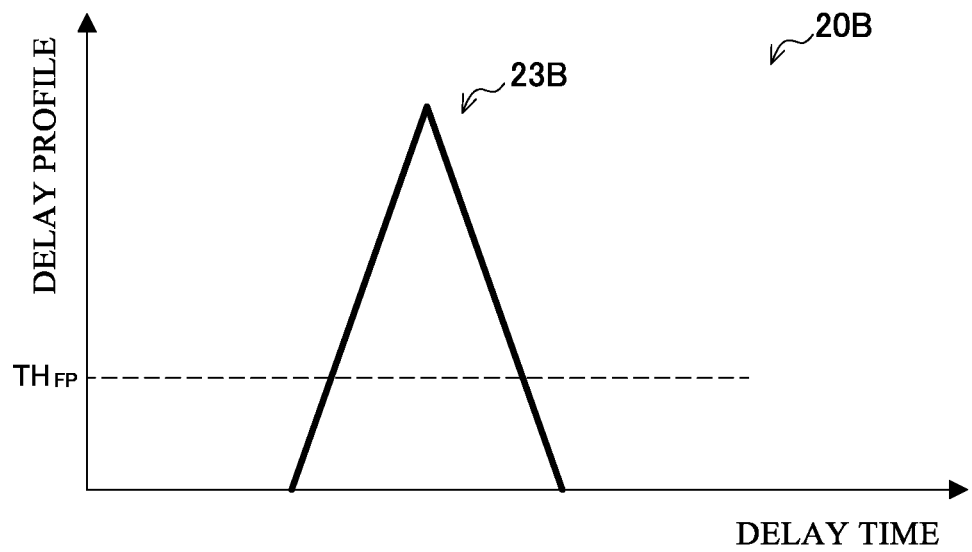

FIG. 16
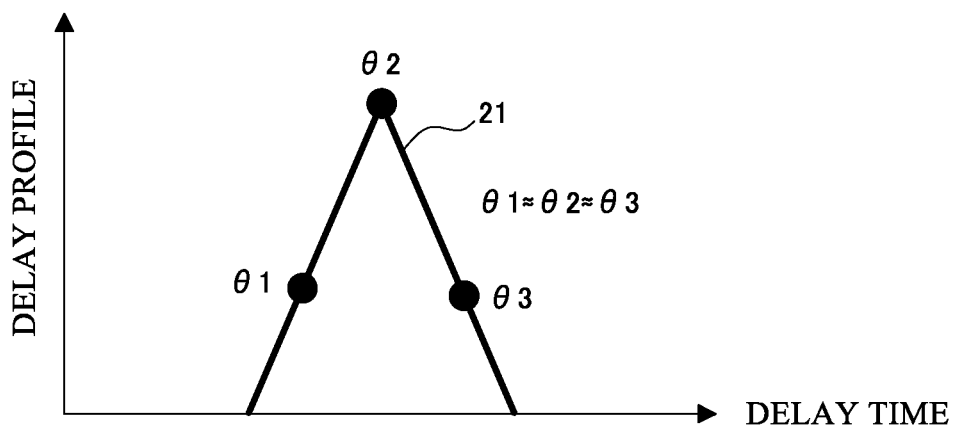
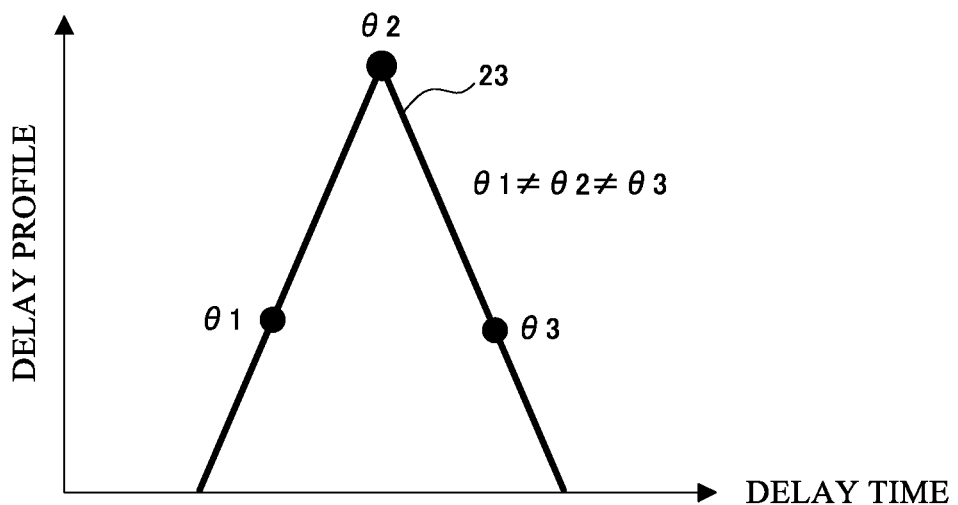

COMMUNICATION DEVICE AND NON-TRANSITORY COMPUTER READABLE STORAGE MEDIUM

CROSS REFERENCE TO RELATED APPLICATION(S)

This application is based upon and claims benefit of priority from Japanese Patent Application No. 2020-139210, filed on Aug. 20, 2020, the entire contents of which are incorporated herein by reference.

BACKGROUND

The present invention relates to a communication device and a non-transitory computer readable storage medium.

In recent years, technologies that allow one device to estimate a position of another device in accordance with a result of transmitting/receiving a signal between the devices have been developed. As an example of the technologies of determining a position, WO 2015/176776 A1 discloses a technology that allows an UWB (ultra-wideband) receiver to estimate an angle of incidence of a wireless signal from an UWB transmitter by performing wireless communication using UWB.

However, the technology disclosed by WO 2015/176776 A1 does not deal with reduction in accuracy of estimating the angle of incidence of the wireless signal in an environment where an obstacle is interposed between the transmitter and the receiver, or other environments. In addition to dealing with the above-described issue, it has been desired to improve accuracy of the position estimation technologies more.

Accordingly, the present invention is made in view of the aforementioned issues, and an object of the present invention is to provide a mechanism that makes it possible to control wireless communication depending on radio propagation environments.

SUMMARY

To solve the above described problem, according to an aspect of the present invention, there is provided a communication device comprising: a plurality of wireless communication sections, each of which is configured to be capable of wirelessly transmitting and receiving a signal to and from another communication device; and a control section configured to control a repetition process of repeatedly performing a measurement process, on a basis of a first parameter calculated through the measurement process, and control a selection process of selecting a representative wireless communication section from among the plurality of wireless communication sections each time the measurement process is repeated in the repetition process, the measurement process including transmission of a signal from the representative wireless communication section that is the wireless communication section selected from among the plurality of wireless communication sections, reception of the signal by the plurality of wireless communication sections, and calculation of a first parameter belonging to a reliability parameter with regard to at least any of the wireless communication sections, the reliability parameter serving as an indicator that indicates whether a first incoming wave is appropriate for a processing target, the first incoming wave being a signal detected as a signal that meets a predetermined detection standard among the signals received by the wireless communication section.

To solve the above described problem, according to another aspect of the present invention, there is provided a non-transitory computer readable storage medium having a program stored therein, the program causing a computer for controlling a communication device including a plurality of wireless communication sections, each of which is configured to be capable of wirelessly transmitting and receiving a signal to and from another communication device, to function as a control section configured to control a repetition process of repeatedly performing a measurement process, on a basis of a first parameter calculated through the measurement process, and control a selection process of selecting a representative wireless communication section from among the plurality of wireless communication sections each time the measurement process is repeated in the repetition process, the measurement process including transmission of a signal from the representative wireless communication section that is the wireless communication section selected from among the plurality of wireless communication sections, reception of the signal by the plurality of wireless communication sections, and calculation of a first parameter belonging to a reliability parameter with regard to at least any of the wireless communication sections, the reliability parameter serving as an indicator that indicates whether a first incoming wave is appropriate for a processing target, the first incoming wave being a signal detected as a signal that meets a predetermined detection standard among the signals received by the wireless communication section.

As described above, according to the present invention, it is possible to provide the mechanism that makes it possible to control wireless communication depending on radio propagation environments.

BRIEF DESCRIPTION OF THE DRAWINGS

FIG. 13 is graphs illustrating an example of CIRs with regard to a plurality of the wireless communication sections.

FIG. 14 is graphs illustrating an example of CIRs with regard to the plurality of wireless communication sections.

FIG. 16 is diagrams for describing examples of the reliability parameter according to the embodiment.

DETAILED DESCRIPTION OF THE EMBODIMENT(S)

Figure 1:
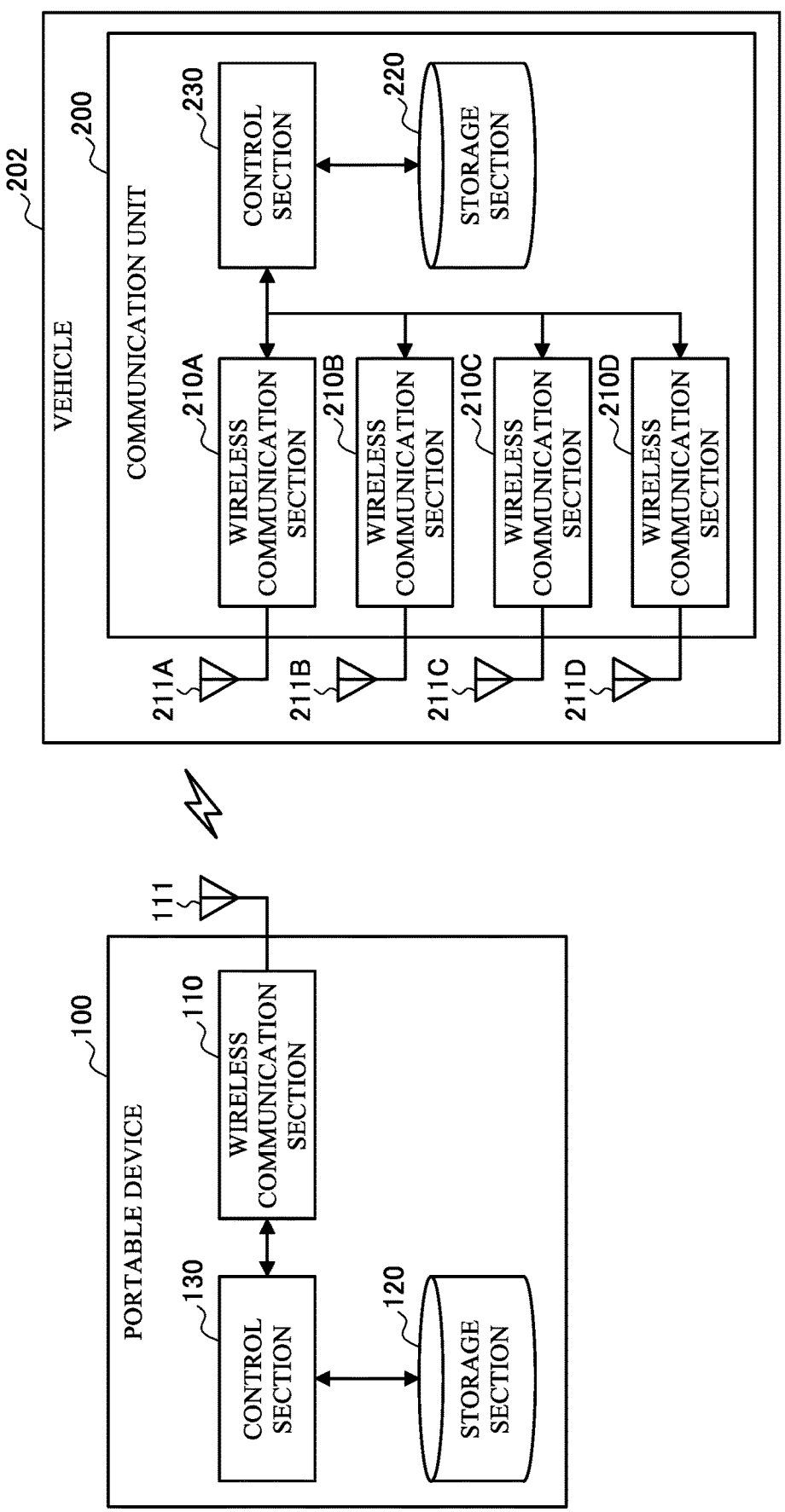
FIG. 1 is a diagram illustrating an example of a configuration of a system according to an embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

Further, in the present specification and the drawings, different alphabets are suffixed to a same reference numeral to distinguish elements which have substantially the same functional configuration. For example, a plurality of elements which have substantially the same functional configuration are distinguished such as wireless communication sections 210A, 210B, and 210C, as necessary. However, when there is no need in particular to distinguish elements that have substantially the same functional configuration, the same reference numeral alone is attached. For example, in the case where it is not necessary to particularly distinguish the wireless communication sections 210A, 210B, and 210C, the wireless communication sections 210A, 210B, and 210C are simply referred to as the wireless communication sections 210.

1. Configuration Example

FIG. 1 is a diagram illustrating an example of a configuration of a system 1 according to an embodiment of the present invention. As illustrated in FIG. 1, the system 1 according to the present embodiment includes a portable device 100 and a communication unit 200. The communication unit 200 according to the present embodiment is installed in a vehicle 202. The vehicle 202 is an example of a usage target of the user.

A communication device of an authenticatee and a communication device of an authenticator are involved in the present embodiment. In the example illustrated in FIG. 1, the portable device 100 is an example of the communication device of the authenticatee, and the communication unit 200 is an example of the communication device of the authenticator.

When a user (for example, a driver of the vehicle 202) carrying the portable device 100 approaches the vehicle 202, the system 1 performs wireless communication for authentication between the portable device 100 and the communication unit 200 installed in the vehicle 202. Next, when the authentication succeeds, the vehicle 202 becomes available for the user by unlocking a door lock of the vehicle 202 and starting an engine of the vehicle 202. The system 1 is also referred to as a smart entry system. Next, respective structural elements will be described sequentially.

(1) Portable Device 100

The portable device 100 is configured as any device to be carried by the user. Examples of the any device include an electronic key, a smartphone, a wearable terminal, and the like. As illustrated in FIG. 1, the portable device 100 includes a wireless communication section 110, a storage section 120, and a control section 130.

The wireless communication section 110 has a function of performing wireless communication with the communication unit 200 installed in the vehicle 202. The wireless communication section 110 wirelessly receives a signal from the communication unit 200 installed in the vehicle 202. In addition, the wireless communication section 110 wirelessly transmits a signal to the communication unit 200.

For example, wireless communication is performed between the wireless communication section 110 and the communication unit 200 by using an ultra-wideband (UWB) signal, for example. In the wireless communication of the UWB signal, it is possible for impulse UWB to measure propagation delay time of a radio wave with high accuracy by using the radio wave of ultra-short pulse width of a nanosecond or less, and it is possible to perform ranging with high accuracy on the basis of the propagation delay time. Note that, the propagation delay time is time from transmission to reception of the radio wave. The wireless communication section 110 is configured as a communication interface that makes it possible to perform communication by using the UWB signals, for example.

Note that, the UWB signal may be transmitted/received as a ranging signal, an angle estimation signal, and a data signal, for example. The ranging signal is a signal transmitted and received in the ranging process (to be described later). The ranging signal may be configured in a frame format that does not include a payload part for storing data or in a frame format that includes the payload part. The angle estimation signal is a signal transmitted and received in an angle estimation process (to be described later). The angle estimation signal may be configured in a way similar to the ranging signal. The data signal is preferably configured in the frame format that includes the payload part for storing the data.

Here, the wireless communication section 110 includes at least one antenna 111. In addition, the wireless communication section 110 transmits/receives a wireless signal via the at least one antenna 111.

The storage section 120 has a function of storing various kinds of information for operating the portable device 100. For example, the storage section 120 stores a program for operating the portable device 100, and an identifier (ID), password, and authentication algorithm for authentication, and the like. For example, the storage section 120 includes a storage medium such as flash memory and a processing device that performs recording/playback on/of the storage medium.

The control section 130 has a function of executing processes in the portable device 100. For example, the control section 130 controls the wireless communication section 110 to perform communication with the communication unit 200 of the vehicle 202. The control section 130 reads information from the storage section 120 and writes information into the storage section 120. The control section 130 also functions as an authentication control section that controls an authentication process between the portable device 100 and the communication unit 200 of the vehicle 202. For example, the control section 130 may include a central processing unit (CPU) and an electronic circuit such as a microprocessor.

(2) Communication Unit 200

The communication unit 200 is prepared in association with the vehicle 202. Here, it is assumed that the communication unit 200 is installed in the vehicle 202 in such a manner that the communication section 200 is installed in a vehicle interior of the vehicle 202, the communication section 200 is built in the vehicle 202 as a communication module, or in other manners. Alternatively, the communication unit 200 may be prepared as a separate object from the vehicle 202 in such a manner that the communication unit 200 is installed in a parking space for the vehicle 202 or in other manners. In this case, the communication unit 200 may wirelessly transmit a control signal to the vehicle 202 on the basis of a result of communication with the portable device 100 and may remotely control the vehicle 202. As illustrated in FIG. 1, the communication unit 200 includes a plurality of wireless communication sections 210 (210A to 210D), a storage section 220, and a control section 230.

The wireless communication section 210 has a function of performing wireless communication with the wireless communication section 110 of the portable device 100. The wireless communication section 210 wirelessly receives a signal from the portable device 100. In addition, the wireless communication section 210 wirelessly transmits a signal to the portable device 100. The wireless communication section 210 is configured as a communication interface that makes it possible to perform communication by using the UWB, for example.

Here, each of the wireless communication sections 210 includes an antenna 211. In addition, each of the wireless communication sections 210 transmits/receives a wireless signal via the antenna 211.

The storage section 220 has a function of storing various kinds of information for operating the communication unit 200. For example, the storage section 220 stores a program for operating the communication unit 200, an authentication algorithm, and the like. For example, the storage section 220 includes a storage medium such as flash memory and a processing device that performs recording/playback on/of the storage medium.

The control section 230 has a function of controlling overall operation performed by the communication unit 200 and in-vehicle equipment installed in the vehicle 202. For example, the control section 230 controls the wireless communication sections 210 to perform communication with the portable device 100. The control section 230 reads information from the storage section 220 and writes information into the storage section 220. The control section 230 also functions as an authentication control section that controls the authentication process between the portable device 100 and the communication unit 200 of the vehicle 202. In addition, the control section 230 also functions as a door lock control section that controls a door lock of the vehicle 202, and opens and closes the door lock. The control section 230 also functions as an engine control section that controls the engine of the vehicle 202, and starts/stops the engine. Note that, a motor or the like may be installed as a power source in the vehicle 202 in addition to the engine. For example, the control section 230 is configured as an electronic circuit such as an electronic control unit (ECU).

2. Estimation of Positional Parameter

<2.1. Positional Parameter>

The communication unit 200 (specifically, control section 230) according to the present embodiment performs a positional parameter estimation process of estimating a positional parameter that represents a position of the portable device 100. Hereinafter, with reference to FIG. 2 to FIG. 4, various definitions related to the positional parameter will be described.

Figure 2:
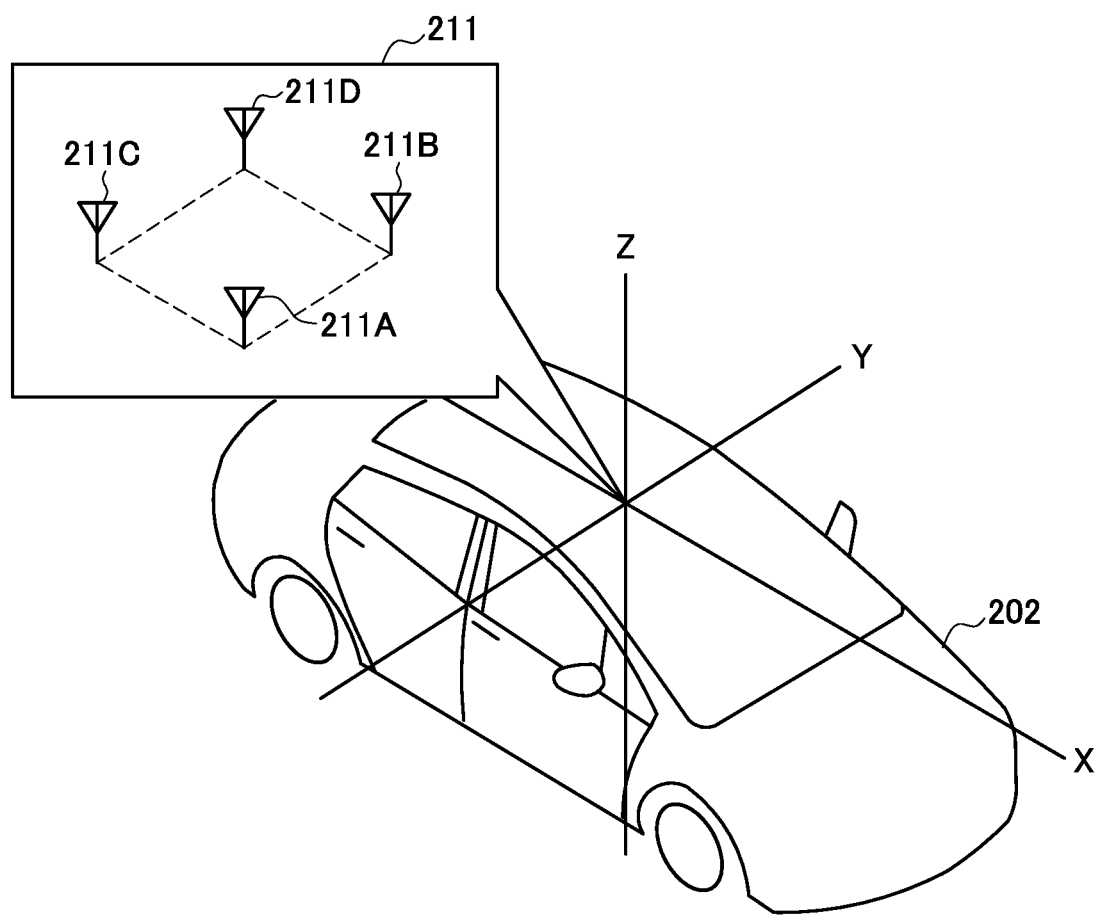
FIG. 2 is a diagram illustrating an example of arrangement of a plurality of antennas installed in a vehicle according to the embodiment.

FIG. 2 is a diagram illustrating an example of arrangement of the plurality of antennas 211 (wireless communication sections 210) installed in the vehicle 202 according to the present embodiment. As illustrated in FIG. 2, the four antennas 211 (211A to 211D) are installed on a ceiling of the vehicle 202. The antenna 211A is installed on a front right side of the vehicle 202. The antenna 211B is installed on a front left side of the vehicle 202. The antenna 211C is installed on a rear right side of the vehicle 202. The antenna 211D is installed on a rear left side of the vehicle 202. Note that, distances between adjacent antennas 211 are set to a half or less of wavelength $\lambda$ of a carrier wave of an angle estimation signal (to be described later). A local coordinate system of the communication unit 200 is set as a coordinate system based on the communication unit 200. An example of the local coordinate system of the communication unit 200 has its origin at the center of the four antennas 211. This local coordinate system has its X axis along a front-rear direction of the vehicle 202, its Y axis along a left-right direction of the vehicle 202, and its Z axis along an up-down direction of the vehicle 202. Note that, the X axis is parallel to a line connecting a pair of the antennas in the front-rear direction (such as a pair of the antenna 211A and the antenna 211C, and a pair of the antenna 211B and the antenna 211D). In addition, the Y axis is parallel to a line connecting a pair of the antennas in the left-right direction (such as a pair of the antenna 211A and the antenna 211B, and a pair of the antenna 211C and the antenna 211D).

Note that, the arrangement of the four antennas 211 is not limited to the square shape. The arrangement of the four antennas 211 may be a parallelogram shape, a trapezoid shape, a rectangular shape, or any other shapes. Of course, the number of antennas 211 is not limited to four.

Figure 3:
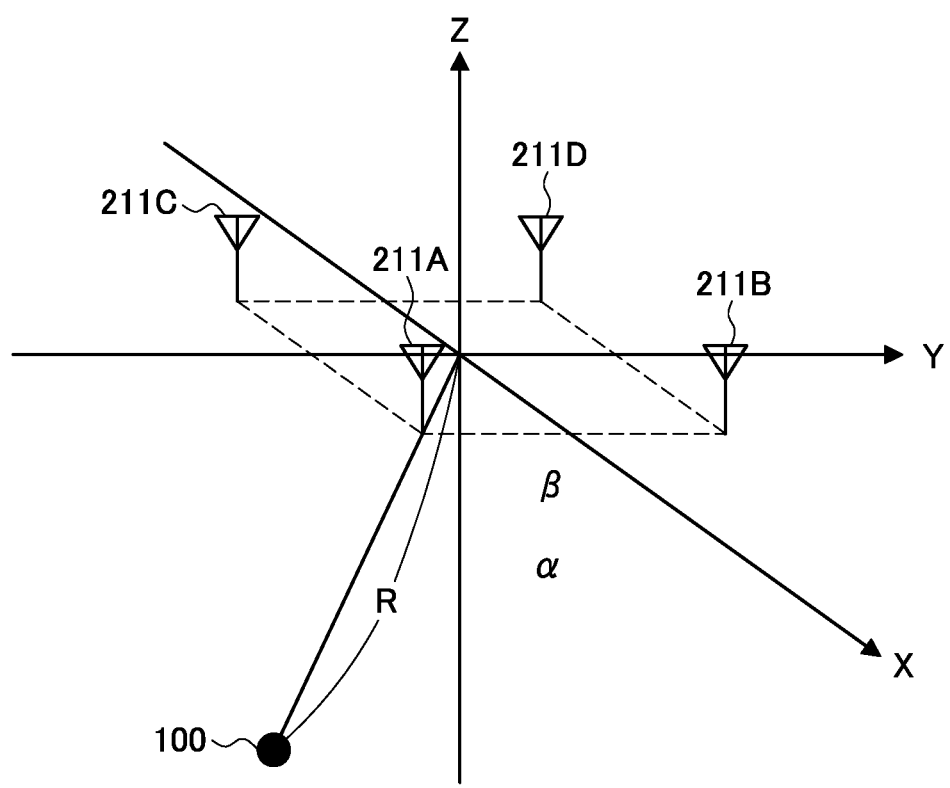
FIG. 3 is a diagram illustrating an example of a positional parameter of a portable device according to the embodiment.

FIG. 3 is a diagram illustrating an example of a positional parameter of the portable device 100 according to the present embodiment. The positional parameter may include a distance R between the portable device 100 and the communication unit 200. The distance R illustrated in FIG. 3 is a distance from the origin of the local coordinate system of the communication unit 200 to the portable device 100. The distance R is estimated on the basis of a result of transmission/reception of a ranging signal (to be described later) between the portable device 100 and one of the plurality of wireless communication sections 210. The distance R may be a distance between the portable device 100 and one of the wireless communication sections 210 that transmit/receive the ranging signal (to be described later).

In addition, as illustrated in FIG. 3, the positional parameter may include an angle of the portable device 100 based on the communication unit 200, the angle including an angle $\alpha$ between the X axis and the portable device 100 and an angle $\beta$ between the Y axis and the portable device 100. The angles α and β are angles between the coordinate axes of a first predetermined coordinate system and a straight line connecting the portable device 100 with the origin of the first predetermined coordinate system. For example, the first predetermined coordinate system is the local coordinate system of the communication unit 200. The angle α is an angle between the X axis and the straight line connecting the portable device 100 with the origin. The angle β is an angle between the Y axis and the straight line connecting the portable device 100 with the origin.

Figure 4:
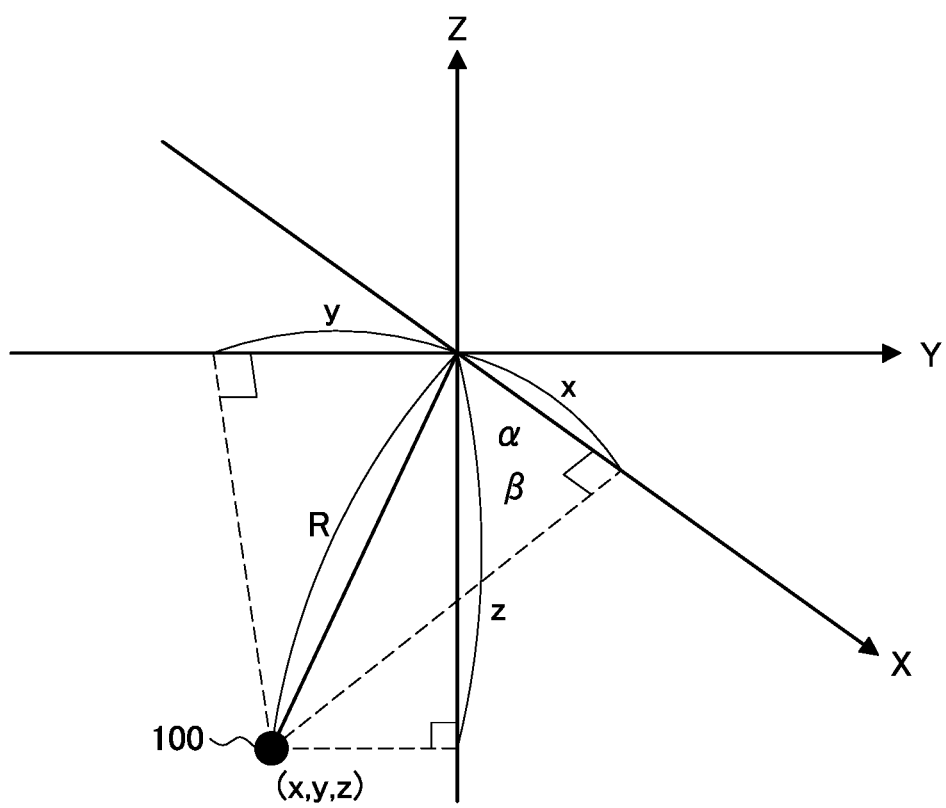
FIG. 4 is a diagram illustrating an example of the positional parameter of the portable device according to the embodiment.

FIG. 4 is a diagram illustrating an example of the positional parameter of the portable device 100 according to the present embodiment. The positional parameter may include coordinates of the portable device 100 in a second predetermined coordinate system. In FIG. 4, a coordinate x on the X axis, a coordinate y on the Y axis, and a coordinate z on the Z axis of the portable device 100 are an example of such coordinates. In other words, the second predetermined coordinate system may be the local coordinate system of the communication unit 200. Alternatively, the second predetermined coordinate system may be a global coordinate system.

<2.2. CIR>

(1) CIR Calculation Process

In the positional parameter estimation process, the portable device 100 and the communication unit 200 communicate with each other to estimate the positional parameter. At this time, the portable device 100 and the communication unit 200 calculates channel impulse responses (CIRs).

The CIR is a response obtained when an impulse is input to the system. In the case where a wireless communication section of one of the portable device 100 and the communication unit 200 (hereinafter, also referred to as a transmitter) transmits a signal including a pulse as a first signal, the CIR according to the present embodiment is calculated on the basis of a second signal that corresponds to the first signal and that is received by a wireless communication section of the other (hereinafter, also referred to as a receiver). The pulse is a signal including change in amplitude. It can be said that the CIR indicates characteristics of a wireless communication path between the portable device 100 and the communication unit 200. Hereinafter, the first signal is also referred to as a transmission signal, and the second signal is also referred to as a reception signal.

For example, the CIR may be a correlation computation result that is a result obtained by correlating the transmission signal with the reception signal at each designated interval. Here, the correlation may be sliding correlation that is a process of correlating the transmission signal with the reception signal by shifting relative positions of the signals in a time direction. The correlation computation result includes a correlation value indicating a degree of the correlation between the transmission signal and the reception signal as an element obtained at each designated interval. The designated interval is an interval between timings at which the receiver samples the reception signal. Therefore, an element included in the CIR is also referred to as a sampling point. The correlation value may be a complex number including IQ components. In addition, the correlation value may be a phase or amplitude of the complex number. In addition, the correlation value may be electric power that is a sum of squares of an I component and a Q component of the complex number (or square of amplitude).

The CIR is also considered as a set of elements that are values obtained at respective times (hereinafter, also referred to as CIR values). In this case, the CIR is chronological variation in the CIR value. In the case where the CIR is the correlation computation result, the CIR value is the correlation value.

Note that, the portable device 100 and the communication unit 200 acquire time by using a time counter. The time counter is a counter that counts (typically, increments) a value (hereinafter, also referred to as count value) indicating elapsed time obtained at a predetermined time interval (hereinafter, also referred to as count cycle). A current time is calculated on the basis of the count value counted by the time counter, the count cycle, and a count start time. If different devices have a same count cycle and a same count start time, this means that these devices are in synchronization with each other. On the other hand, if at least any of the count cycle and the count start time is different between the different devices, this means that these devices are not in synchronization with each other or are asynchronous with each other. The portable device 100 and the communication unit 200 may be in synchronization with each other or asynchronous with each other. In addition, the plurality of wireless communication sections 210 may be in synchronization with each other or asynchronous with each other. The designated interval used when calculating the CIR may be an integer multiple of the count cycle of the time counter.

Hereinafter, with reference to FIG. 5, a CIR calculation process performed in the case where the portable device 100 serves as the transmitter and the communication unit 200 serves as the receiver will be described in detail.

Figure 5:
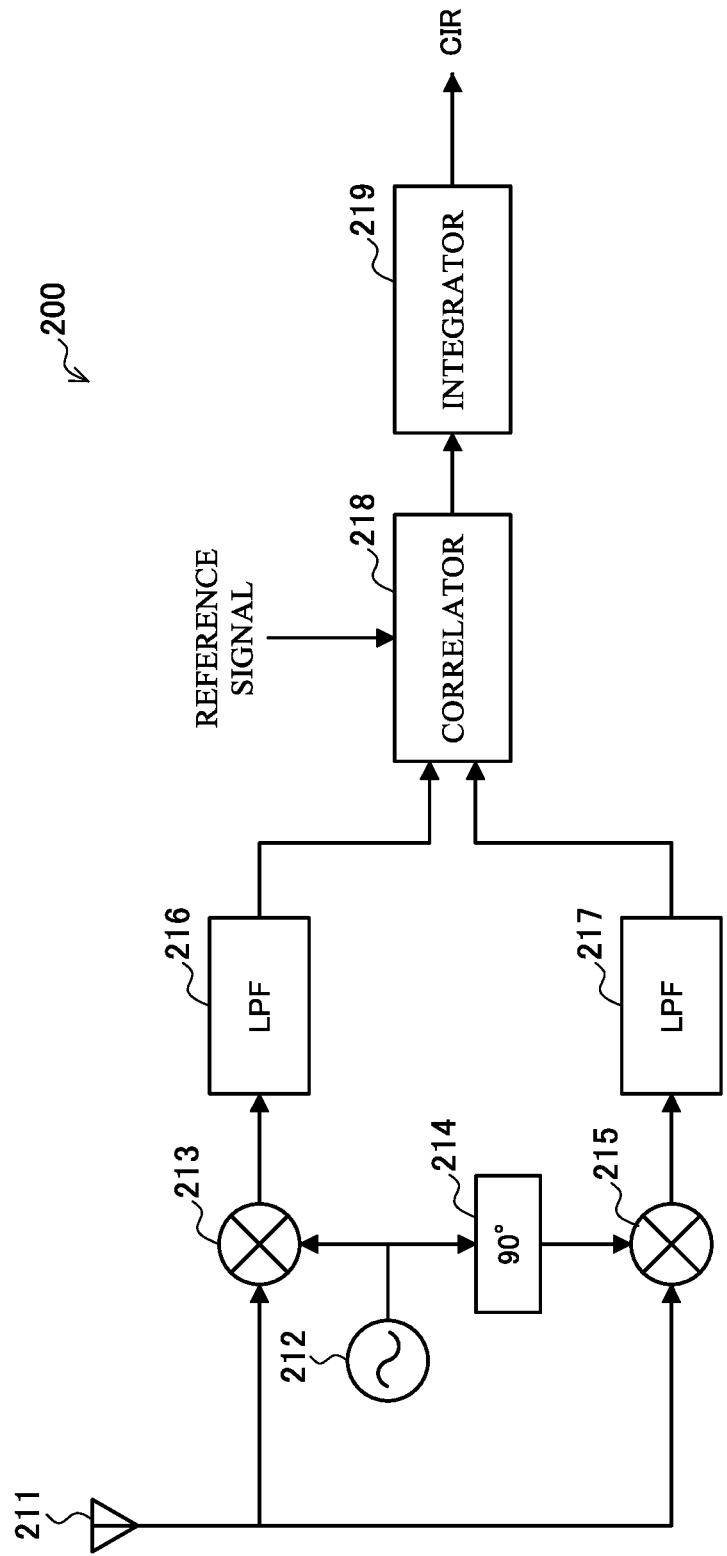
FIG. 5 is a diagram illustrating an example of processing blocks for signal processing in a communication unit according to the embodiment.

FIG. 5 is a diagram illustrating an example of processing blocks for signal processing in the communication unit 200 according to the present embodiment. As illustrated in FIG. 5, the communication unit 200 includes an oscillator 212, a multiplier 213, a 90-degree phase shifter 214, a multiplier 215, a low pass filter (LPF) 216, an LPF 217, a correlator 218, and an integrator 219.

The oscillator 212 generates a signal of same frequency as frequency of a carrier wave that carries a transmission signal, and outputs the generated signal to the multiplier 213 and the 90-degree phase shifter 214.

The multiplier 213 multiplies a reception signal received by the antenna 211 by the signal output from the oscillator 212, and outputs a result of the multiplication to the LPF 216. Among input signals, the LPF 216 outputs a signal of lower frequency than the frequency of the carrier wave that carries the transmission signal, to the correlator 218. The signal input to the correlator 218 is an I component (that is, a real part) among components corresponding to an envelope of the reception signal.

The 90-degree phase shifter 214 delays the phase of the input signal by 90 degrees, and outputs the delayed signal to the multiplier 215. The multiplier 215 multiplies the reception signal received by the antenna 211 by the signal output from the 90-degree phase shifter 214, and outputs a result of the multiplication to the LPF 217. Among input signals, the LPF 217 outputs a signal of lower frequency than the frequency of the carrier wave that carries the transmission signal, to the correlator 218. The signal input to the correlator 218 is a Q component (that is, an imaginary part) among the components corresponding to the envelope of the reception signal.

The correlator 218 calculates the CIR by correlating a reference signal with the reception signals including the I component and the Q component output from the LPF 216 and the LPF 217 through the sliding correlation. Note that, the reference signal described herein is the same signal as the transmission signal before multiplying the carrier wave.

The integrator 219 integrates the CIRs output from the correlator 218, and outputs the integrated CIRs.

Here, the transmitter may transmit a signal including a preamble as the transmission signal. The preamble is a sequence known to the transmitter and the receiver. Typically, the preamble is arranged at a head of the transmission signal. The preamble includes one or more preamble symbols. The preamble symbol is a pulse sequence including one or more pulses. The pulse sequence is a set of the plurality of pulses that are separate from each other in the time direction.

The preamble symbol is a target of integration performed by the integrator 219. Therefore, the correlator 218 calculates the CIR for each of the one or more preamble symbols by correlating a portion corresponding to a preamble symbol with a preamble symbol included in the transmission signal with regard to each of portions corresponding to the one or more preamble symbols included in the reception signal, at the designated intervals. Next, the integrator 219 obtains integrated CIRs by integrating the CIRs of the respective preamble symbols with regard to the one or more preamble symbols included in the preamble. Next, the integrator 219 outputs the integrated CIRs. Hereinafter, the CIR means the integrated CIRs unless otherwise noted.

(2) Example of CIR

Figure 6:
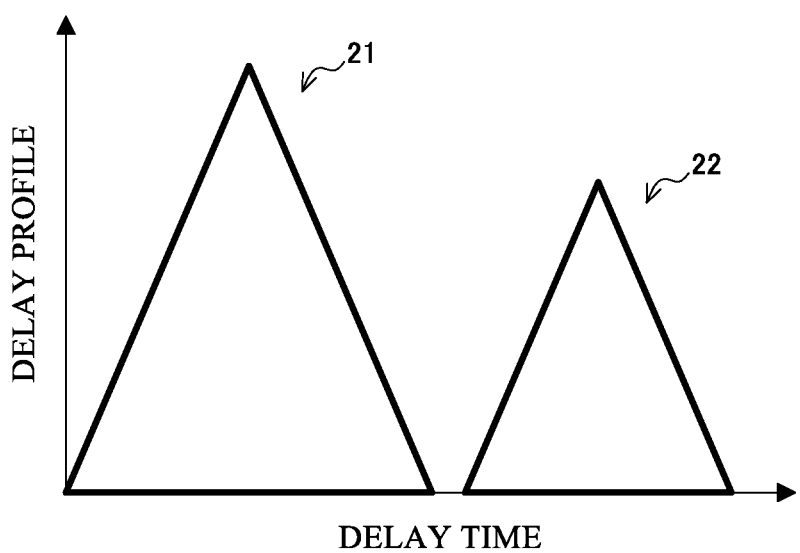
FIG. 6 is a graph illustrating an example of a CIR according to the embodiment.

FIG. 6 illustrates an example of the CIR output from the integrator 219. FIG. 6 is a graph illustrating an example of the CIR according to the present embodiment. The CIR illustrated in FIG. 6 is a CIR obtained on an assumption that the count start time is time when the transmitter has transmitted the transmission signal. Such a CIR is also referred to as delay profile. The graph includes a horizontal axis representing delay time. The delay time is time elapsed after the time when the transmitter has transmitted the transmission signal. The graph includes a vertical axis representing absolute values of CIR values (such as amplitude or electric power).

Note that, the shape of CIR, more specifically, the shape of chronological change in the CIR value may also be referred to as a CIR waveform. Typically, a set of elements obtained between a zero-crossing and another zero-crossing corresponds to a single pulse with regard to the CIR. The zero-crossings are elements whose value is zero. However, the same does not apply to an environment with noise. For example, a set of elements obtained between intersections of a standard with chronological change in the CIR value may be treated as corresponding to the single pulse. The CIR illustrated in FIG. 6 includes a set 21 of elements corresponding to a certain pulse, and a set 22 of elements corresponding to another pulse.

For example, the set 21 corresponds to a signal (such as pulse) that reaches the receiver through a first path. The first path is a shortest path between the transmitter and the receiver. In an environment that includes no obstacle. The first path is a straight path between the transmitter and the receiver. For example, the set 22 corresponds to a signal (such as pulse) that reaches the receiver through a path other than the first path. As described above, the signals that have passed through different paths are also referred to as multipath waves.

(3) Detection of First Incoming Wave

Among wireless signals received from the transmitter, the receiver detects a signal that meets a predetermined detection standard as a signal that reaches the receiver through the first path. Next, the receiver estimates the positional parameters on the basis of the detected signal. Hereinafter, the signal detected as the signal that reaches the receiver through the first path is also referred to as the first incoming wave.

The receiver detects a signal that meets a predetermined detection standard as the first incoming wave, among the received wireless signals. For example, the predetermined detection standard is a condition that the CIR value (such as amplitude or electric power) exceeds a predetermined threshold for the first time. In other words, the receiver may detect a signal corresponding to a portion of the CIR obtained when the CIR value exceeds the predetermined threshold for the first time, as the first incoming wave. Hereinafter, the predetermined threshold used for detecting the first incoming wave is also referred to as a first path threshold.

The signal received by the receiver may be any of a direct wave, a delayed wave, or a combined wave. The direct wave is a signal that passes through a shortest path between the transmitter and the receiver, and is received by the receiver. In other words, the direct wave is a signal that reaches the receiver through the first path. The delayed wave is a signal that reaches the receiver through a path different from the shortest path between the transmitter and the receiver, that is, through a path other than the first path. The delayed wave is received by the receiver after getting delayed in comparison with the direct wave. The combined wave is a signal received by the receiver in a state of combining a plurality of signals that have passed through a plurality of different paths.

Here, it should be noted that the signal detected as the first incoming wave is not necessarily the direct wave. For example, if the direct wave is received in a state where the direct wave and the delayed wave annihilate each other, sometimes the CIR value of the CIR corresponding to the direct wave falls below the predetermined threshold and the direct wave is not detected as the first incoming wave. In this case, the combined wave or the delayed wave coming while being delayed behind the direct wave is detected as the first incoming wave.

Reception Time of First Incoming Wave

The receiver may treat the time of meeting the predetermined detection standard as reception time of the first incoming wave. For example, the reception time of the first incoming wave is time corresponding to an element whose CIR value exceeds the first path threshold for the first time, that is, time when the CIR value exceeds the first path threshold for the first time.

Alternatively, the receiver may treat time of obtaining a peak of the detected first incoming wave as the reception time of the first incoming wave. In this case, for example, the reception time of the first incoming wave is time corresponding to an element having highest amplitude or electric power as the CIR value, among the set of elements corresponding to the first incoming wave with regard to the CIR.

Hereinafter, it is assumed that the reception time of the first incoming wave is time corresponding to an element having a CIR value that exceeds the first path threshold for the first time.

Phase of First Incoming Wave

The receiver may treat a phase obtained at time of meeting the predetermined detection standard as a phase of the first incoming wave. For example, the phase of the first incoming wave is a phase serving as a CIR value of an element having the CIR value that exceeds the first path threshold for the first time.

Alternatively, the receiver may treat a phase of the peak of the detected first incoming wave as the phase of the first incoming wave. In this case, for example, the reception time of the first incoming wave is the phase serving as a CIR value of an element having highest amplitude or electric power as the CIR value, among the set of elements corresponding to the first incoming wave with regard to the CIR.

Hereinafter, it is assumed that the phase of the first incoming wave is a phase serving as a CIR value of an element having the CIR value that exceeds the first path threshold for the first time.

Width of First Incoming Wave

The width of the set of elements corresponding to the first incoming wave in the time direction is also referred to as the width of the first incoming wave. For example, the width of the first incoming wave is the width between a zero-crossing and another zero-crossing of the CIR in the time direction. For another example, the width of the first incoming wave is width between intersections of a standard with chronological change in the CIR value in the time direction.

In the case where only the direct wave is detected as the first incoming wave, the first incoming wave of the CIR has an ideal width. The ideal width obtained when only the direct wave is detected as the first incoming wave can be calculated through theoretical calculation using the waveform of the transmission signal, a reception signal processing method, and the like. On the other hand, in the case where the combined wave is received as the first incoming wave, the width of the first incoming wave of the CIR may be different from the ideal width. For example, in the case where a combined wave obtained by combining a direct wave and a delayed wave having a same phase as the direct wave is detected as the first incoming wave, a portion corresponding to the direct wave and a portion corresponding to the delayed wave are added in a state where they are shifted in the time direction. Therefore, the portions reinforce each other, and the first incoming wave in the CIR has a wider width. On the other hand, in the case where a combined wave obtained by combining a direct wave and a delayed wave having an opposite phase from the direct wave is detected as the first incoming wave, the direct wave and the delayed wave annihilate each other. Therefore, the first incoming wave in the CIR has a narrower width.

<2.3. Estimation of Positional Parameter>

(1) Ranging

The communication unit 200 performs the ranging process. The ranging process is a process of estimating a distance between the communication unit 200 and the portable device 100. For example, the distance between the communication unit 200 and the portable device 100 is the distance R illustrated in FIG. 3. The ranging process includes transmission/reception of a ranging signal and calculation of the distance R based on propagation delay time of the ranging signal. The ranging signal is a signal used for ranging among signals transmitted/received between the portable device 100 and the communication unit 200. The propagation delay time is time from transmission to reception of the signal.

Here, the ranging signal is transmitted/received by one of the plurality of wireless communication sections 210 of the communication unit 200. Hereinafter, the wireless communication section 210 that transmits/receives the ranging signal is also referred to as a master. The distance R is a distance between the wireless communication section 210 serving as the master (more precisely, the antenna 211) and the portable device 100 (more precisely, the antenna 111). In addition, the wireless communication sections 210 other than the wireless communication section 210 that transmits/receives the ranging signal are also referred to as slaves.

In the ranging process, a plurality of the ranging signals may be transmitted and received between communication unit 200 and the portable device 100. Among the plurality of ranging signals, a ranging signal transmitted from one device to the other device is also referred to as a first ranging signal. Next, a ranging signal transmitted as a response to the first ranging signal from the device that has received the first ranging signal to the device that has transmitted the first ranging signal is also referred to as a second ranging signal. In addition, a ranging signal transmitted as a response to the second ranging signal from the device that has received the second ranging signal to the device that has transmitted the second ranging signal is also referred to as a third ranging signal.

Next, with reference to FIG. 7, an example of a flow of the ranging process will be described.

Figure 7:
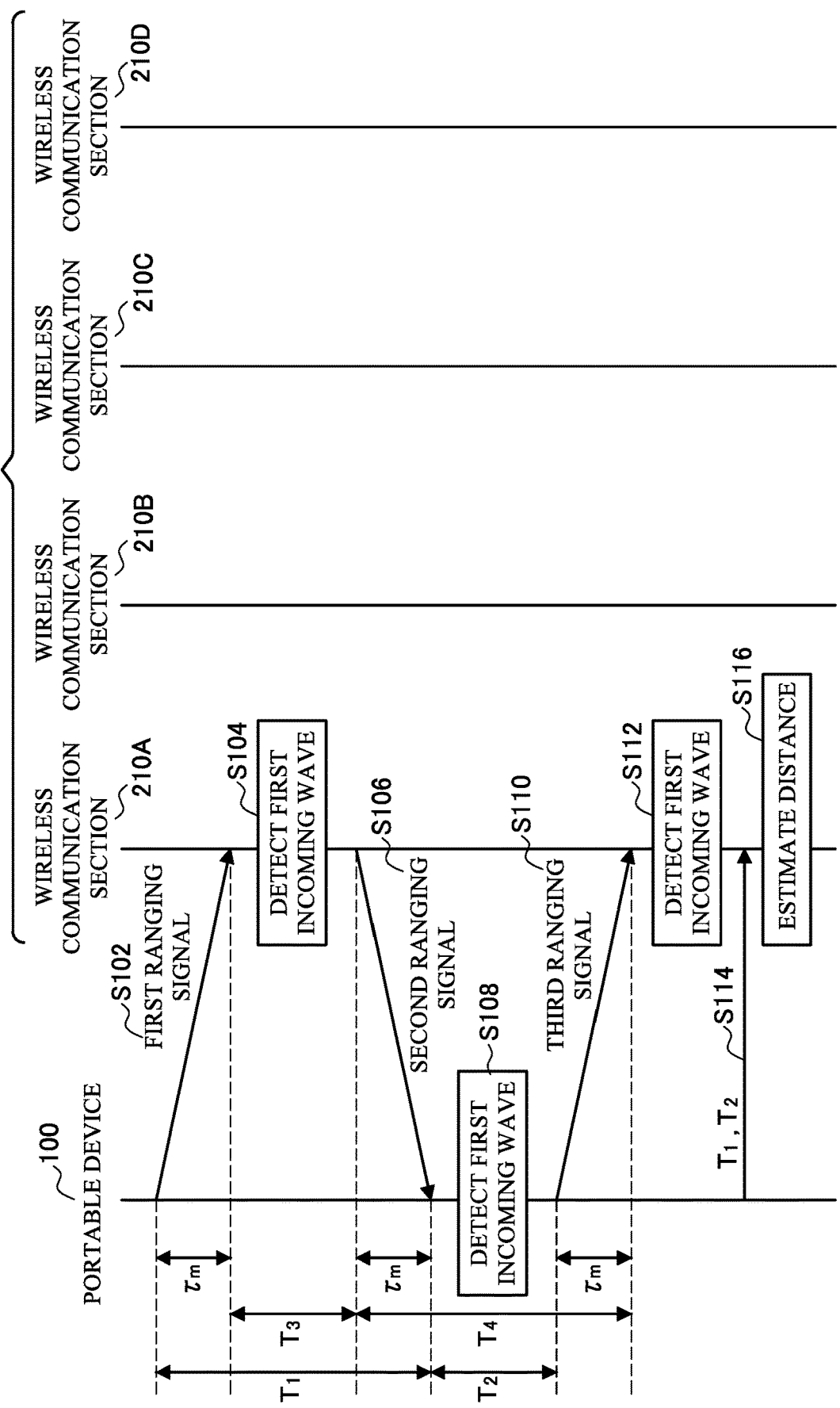
FIG. 7 is a sequence diagram illustrating an example of a flow of a ranging process performed in the system according to the embodiment.

FIG. 7 is a sequence diagram illustrating the example of the flow of the ranging process executed in the system 1 according to the present embodiment. The portable device 100 and the communication unit 200 are involved in this sequence. It is assumed that the wireless communication section 210A functions as the master in this sequence.

As illustrated in FIG. 7, the portable device 100 first transmits the first ranging signal (Step S102). When the wireless communication section 210A receives the first ranging signal, the control section 230 calculates a CIR of the first ranging signal. Next, the control section 230 detects a first incoming wave of the first ranging signal of the wireless communication section 210A on the basis of the calculated CIR (Step S104).

Next, the wireless communication section 210A transmits the second ranging signal in response to the first ranging signal (Step S106). When the second ranging signal is received, the portable device 100 calculates a CIR of the second ranging signal. Next, the portable device 100 detects a first incoming wave of the second ranging signal on the basis of the calculated CIR (Step S108).

Next, the portable device 100 transmits the third ranging signal in response to the second ranging signal (Step S110). When the wireless communication section 210A receives the third ranging signal, the control section 230 calculates a CIR of the third ranging signal. Next, the control section 230 detects a first incoming wave of the third ranging signal of the wireless communication section 210A on the basis of the calculated CIR (Step S112).

The portable device 100 measures a time period $T_1$ from transmission time of the first ranging signal to reception time of the second ranging signal, and a time period $T_2$ from reception time of the second ranging signal to transmission time of the third ranging signal. Here, the reception time of the second ranging signal is reception time of the first incoming wave of the second ranging signal detected in Step S108. Next, the portable device 100 transmits a signal including information indicating the time period $T_1$ and the time period $T_2$ (Step S114). For example, such a signal is received by the wireless communication section 210A.

The control section 230 measures a time period $T_3$ from reception time of the first ranging signal to transmission time of the second ranging signal, and a time period $T_4$ from transmission time of the second ranging signal to reception time of the third ranging signal. Here, the reception time of the first ranging signal is reception time of the first incoming wave of the first ranging signal detected in Step S104. In a similar way, the reception time of the third ranging signal is reception time of the first incoming wave of the third ranging signal detected in Step S112.

Next, the control section 230 estimates the distance R on the basis of the time periods $T_1$, $T_2$, $T_3$, and $T_4$ (Step S116). For example, the control section 230 estimates propagation delay time $\tau_m$ by using an equation listed below.

$$\tau_m = \frac{T_1 \times T_4 - T_2 \times T_3}{T_1 + T_2 + T_3 + T_4} \quad (1)$$

Next, the control section 230 estimates the distance R by multiplying the estimated propagation delay time $\tau_m$ by speed of the signal.

Cause of Reduction in Accuracy of Estimation

The reception times of the ranging signals serving as start or end of the time periods $T_1$, $T_2$, $T_3$, and $T_4$ are reception times of the first incoming waves of the ranging signals. As described above, the signals detected as the first incoming wave are not necessarily the direct waves.

In the case where the combined wave or the delayed wave coming while being delayed behind the direct wave is detected as the first incoming wave, reception time of the first incoming wave varies in comparison with the case where the direct wave is detected as the first incoming wave. In this case, an estimation result of the propagation delay time $\tau_m$ is changed from a true value (an estimation result obtained in the case where the direct wave is detected as the first incoming wave). In addition, this change deteriorates accuracy of estimating the distance R (hereinafter, also referred to as ranging accuracy).

(2) Angle Estimation

The communication unit 200 performs the angle estimation process. The angle estimation process is a process of estimating the angles $\alpha$ and $\beta$ illustrated in FIG. 3. An angle acquisition process includes reception of an angle estimation signal and calculation of the angles $\alpha$ and $\beta$ on the basis of a result of reception of the angle estimation signal. The angle estimation signal is a signal used for estimating an angle among signals transmitted/received between the portable device 100 and the communication unit 200. Next, with reference to FIG. 8, an example of a flow of the angle estimation process will be described.

Figure 8:
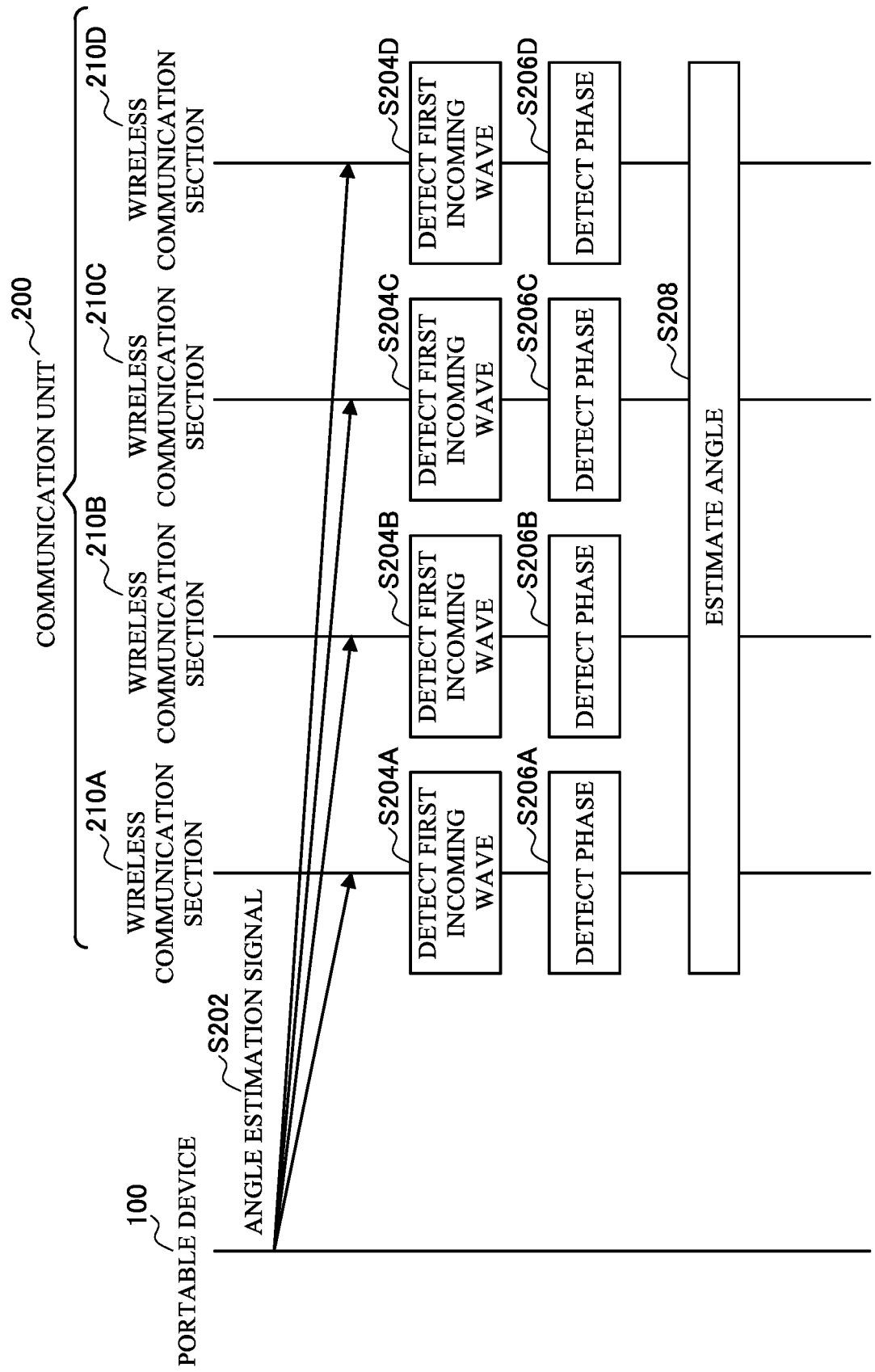
FIG. 8 is a sequence diagram illustrating an example of a flow of an angle estimation process performed in the system according to the embodiment.

FIG. 8 is a sequence diagram illustrating the example of the flow of the angle estimation process executed in the system 1 according to the present embodiment. The portable device 100 and the communication unit 200 are involved in this sequence.

As illustrated in FIG. 8, the portable device 100 first transmits the angle estimation signals (Step S202). Next, when the wireless communication sections 210A to 210D receive respective angle estimation signals, the control section 230 calculates CIRs of the respective angle estimation signals received by the wireless communication sections 210A to 210D. Next, the control section 230 detects first incoming waves of the respective angle estimation signals on the basis of the calculated CIRs with regard to the wireless communication sections 210A to 210D (Step S204A to Step S204D). Next, the control section 230 detects respective phases of the detected first incoming waves with regard to the wireless communication sections 210A to 210D (Step S206A to Step S206D). Next, the control section 230 estimates the angles $\alpha$ and $\beta$ on the basis of the respective phases of the detected first incoming waves with regard to the wireless communication sections 210A to 210D (Step S208).

Next, details of the process in Step S208 will be described. $P_A$ represents the phase of the first incoming wave detected with regard to the wireless communication section 210A. $P_B$ represents the phase of the first incoming wave detected with regard to the wireless communication section 210B. $P_C$ represents the phase of the first incoming wave detected with regard to the wireless communication section 210C. $P_D$ represents the phase of the first incoming wave detected with regard to the wireless communication section 210D. In this case, antenna array phase differences $Pd_{AC}$ and $Pd_{BD}$ in the X axis direction and antenna array phase differences $Pd_{BA}$ and $Pd_{DC}$ in the Y axis direction are expressed in respective equations listed below.

$$Pd_{AC} = (P_A - P_C)$$

$$Pd_{BD} = (P_B - P_D)$$

$$Pd_{DC} = (P_D - P_C)$$

$$Pd_{BA} = (P_B - P_A) \quad (2)$$

The angles $\alpha$ and $\beta$ are calculated by using the following equation. Here, $\lambda$ represents wavelength of a carrier wave of the angle estimation signal, and d represents a distance between the antennas 211.

$$\alpha \text{ or } \beta = \arccos(\lambda \cdot Pd / (2 \cdot \pi \cdot d)) \quad (3)$$

Therefore, respective equations listed below represent angles calculated on the basis of the respective antenna array phase differences.

$$\alpha_{AC} = \arccos(\lambda \cdot Pd_{AC} / (2 \cdot \pi \cdot d))$$

$$\alpha_{BD} = \arccos(\lambda \cdot Pd_{BD} / (2 \cdot \pi \cdot d))$$

$$\beta_{DC} = \arccos(\lambda \cdot Pd_{DC} / (2 \cdot \pi \cdot d))$$

$$\beta_{BA} = \arccos(\lambda \cdot Pd_{BA} / (2 \cdot \pi \cdot d)) \quad (4)$$

The control section 230 calculates the angles $\alpha$ and $\beta$ on the basis of the calculated angles $\alpha_{AC}$, $\alpha_{BD}$, $\beta_{DC}$, and $\beta_{BA}$. For example, as expressed in the following equations, the control section 230 calculates the angles $\alpha$ and $\beta$ by averaging the angles calculated with regard to the two respective arrays in the X axis direction and the Y axis direction.

$$\alpha = (\alpha_{AC} + \alpha_{BD}) / 2$$

$$\beta = (\beta_{DC} + \beta_{BA}) / 2 \quad (5)$$

Cause of Reduction in Accuracy of Estimation

As described above, the angles $\alpha$ and $\beta$ are calculated on the basis of the phases of the first incoming waves. As described above, the signals detected as the first incoming waves are not necessarily the direct waves.

In other words, sometimes the delayed wave or the combined wave may be detected as the first incoming wave. Typically, phases of the delayed wave and the combined wave are different from the phase of the direct wave. This difference deteriorates accuracy of angle estimation.

Supplement

Note that, the angle estimation signal may be transmitted/received during the angle estimation process, or at any other timings. For example, the angle estimation signal may be transmitted/received during the ranging process. Specifically, the third ranging signal illustrated in FIG. 7 may be the same as the angle estimation signal illustrated in FIG. 8. In this case, it is possible for the communication unit 200 to calculate the distance R, the angle $\alpha$, and the angle $\beta$ by receiving a single wireless signal that serves as both the angle estimation signal and the third ranging signal.

(3) Coordinate Estimation

The control section 230 performs a coordinate estimation process. The coordinate estimation process is a process of estimating three-dimensional coordinates (x, y, z) of the portable device 100 illustrated in FIG. 4. As the coordinate estimation process, a first calculation method and a second calculation method listed below may be adopted.

First Calculation Method

The first calculation method is a method of calculating the coordinates x, y, and z on the basis of results of the ranging process and the angle estimation process. In this case, the control section 230 first calculates the coordinates x and y by using equations listed below.

$$x = R \cdot \cos \alpha$$

$$y = R \cdot \cos \beta \qquad (6)$$

Here, the distance R, the coordinate x, the coordinate y, and the coordinate z have a relation represented by an equation listed below.

$$R = \sqrt{x^2 + y^2 + z^2} \qquad (7)$$

The control section 230 calculates the coordinate z by using the above-described relation and an equation listed below.

$$z = \sqrt{R^2 - R^2 \cdot \cos^2 \alpha - R \cdot \cos^2 \beta} \qquad (8)$$

Second Calculation Method

The second calculation method is a method of calculating the coordinates x, y, and z while omitting estimation of the angles α and β. First, the above-listed equations (4), (5), (6), and (7) establish a relation represented by equations listed below.

$$x/R = \cos \alpha \qquad (9)$$

$$y/R = \cos \beta \qquad (10)$$

$$x^2 + y^2 + z^2 = R^2 \qquad (11)$$

$$d \cdot \cos \alpha = \lambda \cdot (Pd_{AC}/2 + Pd_{BD}/2)/(2 \cdot \pi) \qquad (12)$$

$$d \cdot \cos \beta = \lambda \cdot (Pd_{DC}/2 + Pd_{BA}/2)/(2 \cdot \pi) \qquad (13)$$

The equation (12) is rearranged for cos α, and cos α is substituted into the equation (9). This makes it possible to obtain the coordinate x by using an equation listed below.

$$x = R \cdot \lambda \cdot (Pd_{AC}/2 + Pd_{BD}/2)/(2 \cdot \pi \cdot d) \qquad (14)$$

The equation (13) is rearranged for cos β, and cos β is substituted into the equation (10). This makes it possible to obtain the coordinate y by using an equation listed below.

$$y = R \cdot \lambda \cdot (Pd_{DC}/2 + Pd_{BA}/2)/(2 \cdot \pi \cdot d) \qquad (15)$$

Next, the equation (14) and the equation (15) are substituted into the equation (11), and the equation (11) is rearranged. This makes it possible to obtain the coordinate z by using an equation listed below.

$$z = \sqrt{R_2 - x^2 - y^2} \qquad (16)$$

The process of estimating the coordinates of the portable device 100 in the local coordinate system has been described above. It is also possible to estimate coordinates of the portable device 100 in the global coordinate system by combining the coordinates of the portable device 100 in the local coordinate system and coordinates of the origin of the local coordinate system relative to the global coordinate system.

Cause of Reduction in Accuracy of Estimation

As described above, the coordinates are calculated on the basis of the propagation delay time and phases. In addition, they are estimated on the basis of the first incoming waves. Therefore, accuracy of estimating the coordinates may deteriorate in a way similar to the ranging process and the angle estimation process.

(4) Estimation of Existence Region

The positional parameter may include a region including the portable device 100 among a plurality of predefined regions. For example, in the case where the region is defined by a distance from the communication unit 200, the control section 230 estimates the region including the portable device 100 on the basis of the distance R estimated through the ranging process. For another example, in the case where the region is defined by an angle with respect to the communication unit 200, the control section 230 estimates the region including the portable device 100 on the basis of the angles α and β estimated through the angle estimation process. For another example, in the case where the region is defined by the three-dimensional coordinates, the control section 230 estimates the region including the portable device 100 on the basis of the coordinates (x, y, z) estimated through the coordinate estimation process.

Alternatively, in a process specific to the vehicle 202, the control section 230 may estimate the region including the portable device 100 among the plurality of regions including the vehicle interior and the vehicle exterior of the vehicle 202. This makes it possible to provide courteous service such as providing different serves in the case where the user is in the vehicle interior and in the case where the user is in the vehicle exterior. In addition, the control section 230 may estimate the region including the portable device 100 among nearby region and faraway region. The nearby region is a region within a predetermined distance from the vehicle 202, and the faraway region is the predetermined distance or more away from the vehicle 202.

(5) Use of Result of Estimating Positional Parameter

For example, a result of estimating the positional parameter may be used for authentication of the portable device 100. For example, the control section 230 determines that the authentication is successful and unlock a door in the case where the portable device 100 is in a region close to the communication unit 200 on a driver seat side.

3. Technical Problem

The plurality of wireless communication sections 210 may include both a wireless communication section 210 in a line-of-sight (LOS) condition and a wireless communication section 210 in a non-line-of-sight (NLOS) condition.

The LOS condition means that the antenna 111 of the portable device 100 and the antenna 211 of the wireless communication section 210 are visible from each other. In the case of the LOS condition, a highest reception electric power of the direct wave is obtained. Therefore, there is a high possibility that the receiver succeeds in detecting the direct wave as the first incoming wave.

The NLOS condition means that the antenna 111 of the portable device 100 and the antenna 211 of the wireless communication section 210 are not visible from each other. In the case of the NLOS condition, reception electric power of the direct wave may become lower than the others. Therefore, there is a possibility that the receiver fails in detecting the direct wave as the first incoming wave.

In the case where the master that transmits/receives the ranging signal in the ranging process is in the NLOS condition, reception electric power of the direct wave is smaller than noise among ranging signals coming from the portable device 100. Accordingly, even if detection of the direct wave as the first incoming wave is successful, the reception time of the first incoming wave may be different due to effects of the noise. In this case, accuracy of ranging deteriorates.

In addition, in the case where the master that transmits/receive the ranging signal in the ranging process is in the NLOS condition, reception electric power of the direct wave becomes lower than the case where the master is in the LOS condition, and detection of the direct wave as the first incoming wave may end in failure. In this case, accuracy of ranging deteriorates.

Therefore, according to the present embodiment, there is provided the technology of selecting, as the master, the wireless communication section 210 that is likely to successfully detect the direct wave as the first incoming wave in the case of repeating wireless communication for estimating the positional parameter. Such a configuration makes it possible to improve positional parameter estimation accuracy including ranging accuracy.

4. Technical Features

<4.1. Detection of Specific Element>

The control section 230 detects a specific element on the basis of a first threshold with regard to each of CIRs respectively obtained from the plurality of wireless communication sections 210. The specific element is one or more of a plurality of elements included in the CIR. Specifically, in the process of detecting the specific element on the basis of the first threshold, the control section 230 detects one or more element whose amplitude component included in the CIR value exceeds the first threshold, as the specific element. The amplitude component included in the CIR value may be amplitude itself or electric power obtained by squaring the amplitude.

The control section 230 may detect a specific element from a CIR. In this case, it is possible to reduce computational load for detecting the specific element in comparison with the case of detecting the plurality of specific elements from a CIR.

The first threshold is the above-described first path threshold. In this case, the specific element is an element corresponding to the first incoming wave.

For example, the control section 230 may detect an element having amplitude or electric power that exceeds the first threshold for the first time, as the specific element. The amplitude or electric power serves as the CIR value. For another example, the control section 230 may detect an element having a peak CIR value as the specific element, in a set of elements corresponding to the first incoming wave, which includes an element having amplitude or electric power that exceeds the first threshold for the first time. The amplitude or electric power serves as the CIR value.

Time of the specific element serves as the reception time of the first incoming wave and is used for ranging. Hereinafter, sometimes the time corresponding to the specific element is also referred to as specific reception time. In addition, the phase of the specific element serves as the phase of the first incoming wave and is used for angle estimation. Therefore, it is possible to improve the accuracy of estimating a positional parameter by detecting a specific element corresponding to the direct wave.

<4.2. Reliability Parameter>

The control section 230 calculates a reliability parameter. The reliability parameter is an indicator indicating whether the detected first incoming wave (that is, specific element) is appropriate for a processing target. More specifically, the reliability parameter is an indicator indicating whether it is appropriate to use the detected specific element for estimating the positional parameter. When mention is made of a plurality of the specific elements detected with regard to the respective wireless communication sections 210, the reliability parameter is an indicator indicating whether each of the detected specific elements is appropriate for the processing target.

When the specific element is appropriate for the processing target, the specific element corresponds to the direct wave. On the other hand, when the specific element is inappropriate for the processing target, the specific element does not correspond to the direct wave. In other words, the reliability parameter can be treated as an indicator that indicates suitability of the detected specific element for an element corresponding to the direct wave. In the case where the detected specific element corresponds to the delayed wave or the combined wave, that is, in the case where the delayed wave or the combined wave is detected as the first incoming wave, the accuracy of estimating the positional parameter deteriorates as described above. Therefore, it is possible to evaluate the accuracy of estimating the positional parameter on the basis of the reliability parameter.

For example, the reliability parameters are continuous values or discrete values. As the reliability parameter has a higher value, the reliability parameter may indicate that the specific element is appropriate for the processing target. In a similar way, as the reliability parameter has a lower value, the reliability parameter may indicate that the specific element is inappropriate for the processing target, and vice versa. Hereinafter, a degree of appropriateness of the specific element for the processing target may also be referred to as reliability. In addition, high reliability means that the specific element is appropriate for the processing target, and low reliability means that the specific element is inappropriate as the processing target.

The control section 230 detects the specific elements and calculates the reliability parameters on the basis of the transmission signal transmitted from the portable device 100 in the positional parameter estimation process and the respective reception signal obtained when the plurality of wireless communication sections 210 receive the transmission signal. Such a transmission signal may be the ranging signal or the angle estimation signal. For example, such a transmission signal may be a signal that is the third ranging signal illustrated in FIG. 7 and that also serves as the angle estimation signal.

Next, examples of the reliability parameter will be described.

First Reliability Parameter

The reliability parameter may include a first reliability parameter that is a difference between time corresponding to an element having a CIR value that exceeds the first path threshold for the first time in a CIR and time corresponding to an element having the maximum CIR value in the CIR.

Hereinafter, the time corresponding to the element having the CIR value that exceeds the first path threshold for the first time in the CIR will be referred to as a first path determination position. For example, the first path determination position is time corresponding to an element having the amplitude or electric power that exceeds the first path threshold for the first time. The amplitude or electric power serves as the CIR value in the CIR. Note that, the first path determination position is synonymous with the reception time of the first incoming wave described above.

Hereinafter, the time corresponding to the element having the maximum CIR value in the CIR will also be referred to as a peak path position. For example, the peak path position is time corresponding to an element having the maximum amplitude or electric power. The amplitude or electric power serves as the CIR value in the CIR.

Hereinafter, with reference to FIG. 9 and FIG. 10, first path determination positions and peak path positions in the LOS condition and the NLOS condition will be described.

Figure 9:
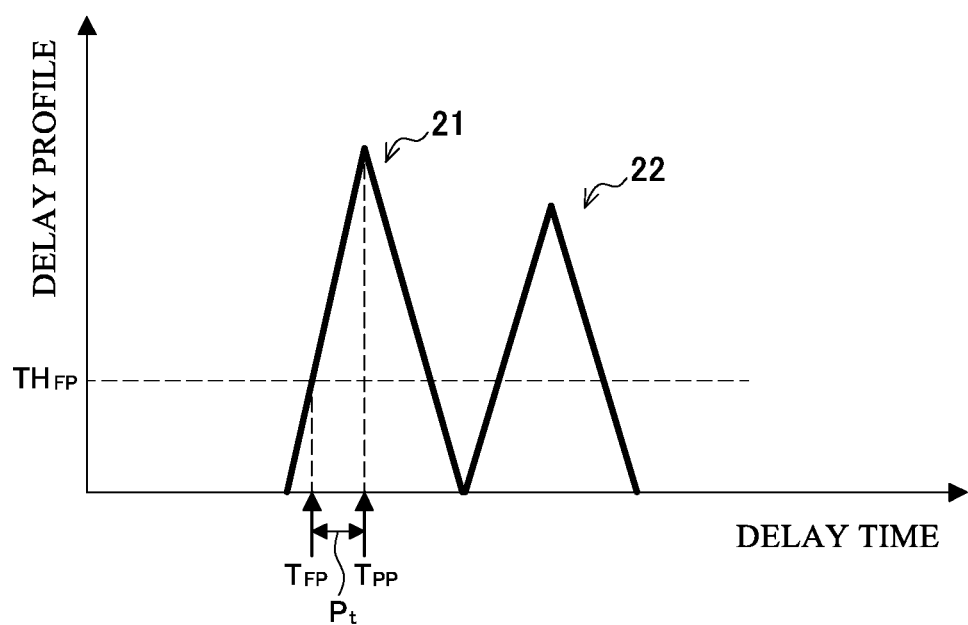
FIG. 9 is a graph illustrating an example of a CIR with regard to a wireless communication section in an LOS condition.

FIG. 9 is a graph illustrating an example of a CIR with regard to the wireless communication section 210 in the LOS condition. FIG. 10 is a graph illustrating an example of a CIR with regard to the wireless communication section 210 in the NLOS condition. The graph includes a horizontal axis representing delay time. The graph includes a vertical axis representing absolute values of CIR values (such as electric power). The CIR s illustrated in FIG. 9 and FIG. 10 include a set 21 of elements corresponding to the direct wave, and a set 22 of elements corresponding to the delayed wave.

In the example illustrated in FIG. 9, the set 21 includes a first path determination position $T_{FP}$ having a CIR value that exceeds the first path threshold $TH_{FP}$ for the first time. In other words, the set 21 corresponds to the first incoming wave. In addition, the set 21 includes a peak path position $T_{PP}$.

Figure 10:
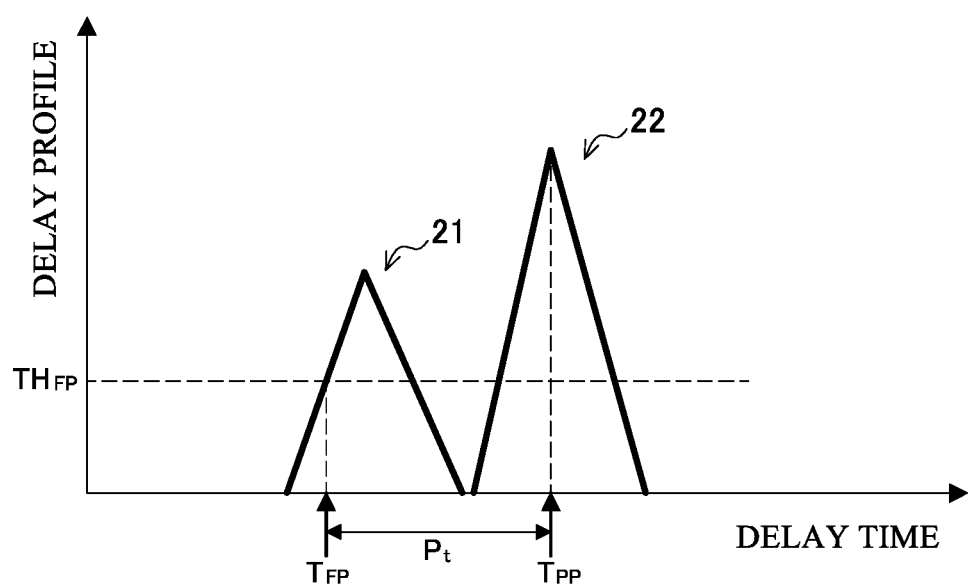
FIG. 10 is a graph illustrating an example of a CIR with regard to the wireless communication section in an NLOS condition.

In the example illustrated in FIG. 10, the set 21 includes a first path determination position $T_{FP}$ having a CIR value that exceeds the first path threshold $TH_{FP}$ for the first time. In other words, the set 21 corresponds to the first incoming wave. In addition, the set 22 includes a peak path position $T_{PP}$.

As illustrated in FIG. 9, in the case of the LOS condition, a peak of the whole CIR appears in the set 21 corresponding to the direct wave. On the other hand, as illustrated in FIG. 10, in the case of the NLOS condition, a peak of the whole CIR appears in the set 22 corresponding to the delayed wave. This is because there is an obstacle in the first path in the case of the NLOS condition. In particular, if a human body is interposed in the first path, the direct wave drastically attenuates when the direct wave passes through the human body. Therefore, a difference Pt between the first path determination position $T_{FP}$ and the peak path position $T_{PP}$ in the LOS condition illustrated in FIG. 9 is smaller than a difference Pt between the first path determination position $T_{FP}$ and the peak path position $T_{PP}$ in the NLOS condition illustrated in FIG. 10. Therefore, the control section 230 determines that reliability gets higher as the difference Pt decreases. On the other hand, the control section 230 determines that reliability gets lower as the difference Pt increases. As described above, it is possible to evaluate the reliability from a viewpoint of the difference Pt.

Therefore, among the respective reliability parameters calculated with respect to the plurality of wireless communication sections 210, the control section 230 may treat a reliability parameter having a smallest difference Pt or a difference Pt that is s smaller than a second threshold, as the optimum parameter. In other words, the control section 230 may select a wireless communication section 210 having the smallest difference Pt or a difference Pt that is smaller than the second threshold as the master from among the wireless communication sections 210. Note that, a threshold $TH_{XL}$ (to be described later) serves as an example of the second threshold. Such a configuration makes it possible to select a wireless communication section 210 that is most likely to be in the LOS condition, as the master. Therefore, it is possible to improve the accuracy of ranging rather than the case of selecting a wireless communication section 210 that is in the NLOS condition as the master.

For example, the control section 230 may calculate an NLOS rate $R_{NLOS}$ on the basis of the difference Pt. Next, the master may be selected on the basis of the NLOS rate $R_{NLOS}$. The NLOS rate $R_{NLOS}$ is a parameter indicating a probability that the wireless communication section 210 is in the NLOS condition. The NLOS rate $R_{NLOS}$ is a value that is 0 or more and 1 or less. For example, when the NLOS rate $R_{NLOS}$ is closer to 1, this means that the wireless communication section 210 is in the NLOS condition. On the other hand, when the NLOS rate $R_{NLOS}$ is closer to zero, this means that the wireless communication section 210 is in the LOS condition. In this case, the control section 230 selects the wireless communication section 210 having a minimum NLOS rate $R_{NLOS}$ as the master. This makes it possible to select the wireless communication section 210 that is most likely to be in the LOS condition, as the master.

Next, an example of a method of calculating the NLOS rate $R_{NLOS}$ will be described. For example, the control section 230 may calculate the NLOS rate $R_{NLOS}$ by using two thresholds $TH_{XL}$ and $TH_{XH}$. Note that, it is assumed that $TH_{XL}<TH_{XH}$ is satisfied.

The control section 230 determines that the NLOS rate $R_{NLOS}$ is zero in the case where the difference Pt≤the threshold $TH_{XL}$. This is because, in the case of the LOS condition as illustrated in FIG. 9, the set 21 corresponding to the direct wave includes both the first path determination position $T_{FP}$ and the peak path position $T_{PP}$. For example, in the case where the set 21 corresponding to the direct wave includes both the first path determination position $T_{FP}$ and the peak path position $T_{PP}$, the threshold $TH_{XL}$ is set to any value that satisfies a relation: the difference Pt≤the threshold $TH_{XL}$.

Here, it is assumed that only the direct wave is received as the first incoming wave. It is unclear which element has the CIR value that exceeds the first path value among the elements corresponding to the first incoming wave in the CIR. Even if the element having the CIR value that exceeds the first path value is an earliest element in the time direction among the elements corresponding to the first incoming wave in the CIR, the difference Pt is a half of the width of the first incoming wave. As described above, in the case where only the direct wave is received as the first incoming wave, the first incoming wave of the CIR has an ideal width. Therefore, an example of a condition regarding the threshold $TH_{XL}$ is a condition that the threshold $TH_{XL}$≤a half of the ideal width obtained in the case where only the direct wave is detected as the first incoming wave is satisfied.

The control section 230 determines that the NLOS rate $R_{NLOS}$ is 1 in the case where the difference Pt≥the threshold $TH_{XH}$. This is because, in the case of the NLOS condition as illustrated in FIG. 10, the set 21 corresponding to the direct wave includes the first path determination position $T_{FP}$ and the set 22 corresponding to the delayed wave may include the peak path position $T_{PP}$. For example, in the case where the first path determination position $T_{FP}$ and the peak path position $T_{PP}$ appear in the respective sets that are different from each other, the threshold $TH_{XH}$ is set to any value that satisfies a relation: the difference Pt≥the threshold $TH_{XH}$.

In the case where the threshold $TH_{XL}$≤the difference Pt<the threshold $TH_{XH}$, the control section 230 calculates a smaller NLOS rate $R_{NLOS}$ as the difference Pt decreases. For example, the control section 230 may calculates the NLOS rate $R_{NLOS}$ by using an equation listed below.

$$R_{NLOS} = \frac{Pt - TH_{XL}}{TH_{XH} - TH_{XL}} \quad (17)$$

Second Reliability Parameter

The reliability parameter may include a second reliability parameter. The second reliability parameter is a result of comparing amplitude or electric power corresponding to the element having the CIR value that exceeds the first threshold for the first time in the CIR with amplitude or electric power corresponding to the element having the maximum CIR value in the CIR.

Hereinafter, the amplitude corresponding to the element having the CIR value that exceeds the first path threshold for the first time in the CIR will be referred to as first path amplitude. For example, the first path amplitude may be amplitude of an element having the amplitude or electric power that exceeds the first path threshold for the first time. The amplitude or electric power serves as the CIR value in the CIR. For another example, the first path amplitude may be amplitude of a first or subsequent element after the element having the amplitude or electric power that exceeds the first path threshold for the first time. The amplitude or electric power serves as the CIR value in the CIR. For example, the first path amplitude may be amplitude of an element having a peak amplitude or electric power for the first time after the element having the amplitude or electric power that exceeds the first path threshold for the first time. The amplitude or electric power serves as the CIR value in the CIR. For another example, the first path amplitude may be a CIR area from a first element having the amplitude or electric power that exceeds the first path threshold for the first time to a second element that is a first or subsequent element after the first element. The amplitude or electric power serves as the CIR value in the CIR. Note that, the CIR area described herein is the integral of the amplitudes serving as the CIR values from the first element to the second element.

Hereinafter, the electric power corresponding to the element having the CIR value that exceeds the first path threshold for the first time in the CIR will be referred to as first path electric power. For example, the first path electric power may be electric power of an element having the amplitude or electric power that exceeds the first path threshold for the first time. The amplitude or electric power serves as the CIR value in the CIR. For another example, the first path electric power may be electric power of a first or subsequent element after the element having the amplitude or electric power that exceeds the first path threshold for the first time. The amplitude or electric power serves as the CIR value in the CIR. For example, the first path electric power may be electric power of an element having a peak amplitude or electric power for the first time after the element having the amplitude or electric power that exceeds the first path threshold for the first time. The amplitude or electric power serves as the CIR value in the CIR. For another example, the first path electric power may be a CIR area from a first element having the amplitude or electric power that exceeds the first path threshold for the first time to a second element that is a first or subsequent element after the first element. The amplitude or electric power serves as the CIR value in the CIR. Note that, the CIR area described herein is the integral of the electric powers serving as the CIR values from the first element to the second element.

Hereinafter, the amplitude corresponding to the element having the maximum CIR value in the CIR will be referred to as a peak path amplitude. For example, the peak path amplitude may be amplitude of an element having the maximum amplitude or electric power. The amplitude or electric power serves as the CIR value in the CIR. For another example, the peak path amplitude may be amplitude of a first or subsequent element after the element having the maximum amplitude or electric power. The amplitude or electric power serves as the CIR value in the CIR. For another example, the peak path amplitude may be a CIR area with regard to a plurality of elements that are subsequent to the element having the maximum amplitude or electric power in the time direction. The amplitude or electric power serves as the CIR value in the CIR. Note that, the CIR area described herein is the integral of the amplitudes serving as the CIR values from a third element to a fourth element. The third element is a leading element and the fourth element is an end element, among the plurality of elements that are subsequent to the element having the maximum amplitude or electric power in the time direction. The third element is the element having the maximum amplitude or electric power, or a first or more preceding element before such an element. The amplitude or electric power serves as the CIR value in the CIR. The fourth element is the element having the maximum amplitude or electric power, or a first or subsequent element after such an element. The amplitude or electric power serves as the CIR value in the CIR. For example, the CIR area may be a CIR area with regard to 2X+1 number of elements that include the element having the maximum amplitude or electric power and X number of elements that are disposed before or after such an element. The amplitude or electric power serves as the CIR value in the CIR.

Hereinafter, the electric power corresponding to the element having the maximum CIR value in the CIR will be referred to as a peak path electric power. For example, the peak path electric power may be electric power of an element having the maximum amplitude or electric power. The amplitude or electric power serves as the CIR value in the CIR. For another example, the peak path electric power may be electric power of a first or subsequent element after the element having the maximum amplitude or electric power. The amplitude or electric power serves as the CIR value in the CIR. For another example, the peak path electric power may be a CIR area with regard to a plurality of elements that are subsequent to the element having the maximum amplitude or electric power in the time direction. The amplitude or electric power serves as the CIR value in the CIR. Note that, the CIR area described herein is the integral of the electric powers serving as the CIR values from the third element to the fourth element. The third element is a leading element and the fourth element is an end element, among the plurality of elements that are subsequent to the element having the maximum amplitude or electric power in the time direction.

Figure 11:
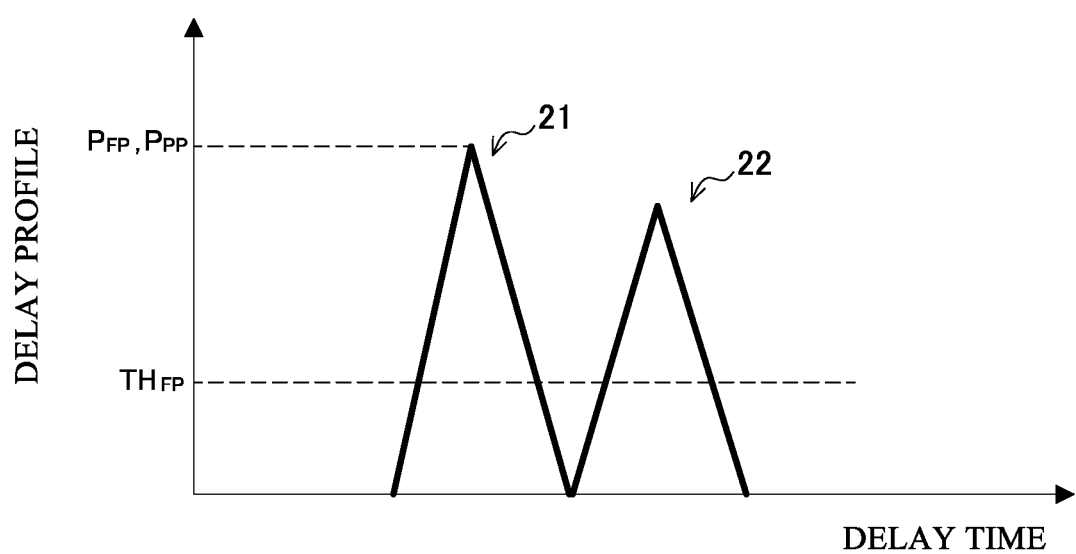
FIG. 11 is a graph illustrating an example of a CIR with regard to the wireless communication section in the LOS condition.
Figure 12:
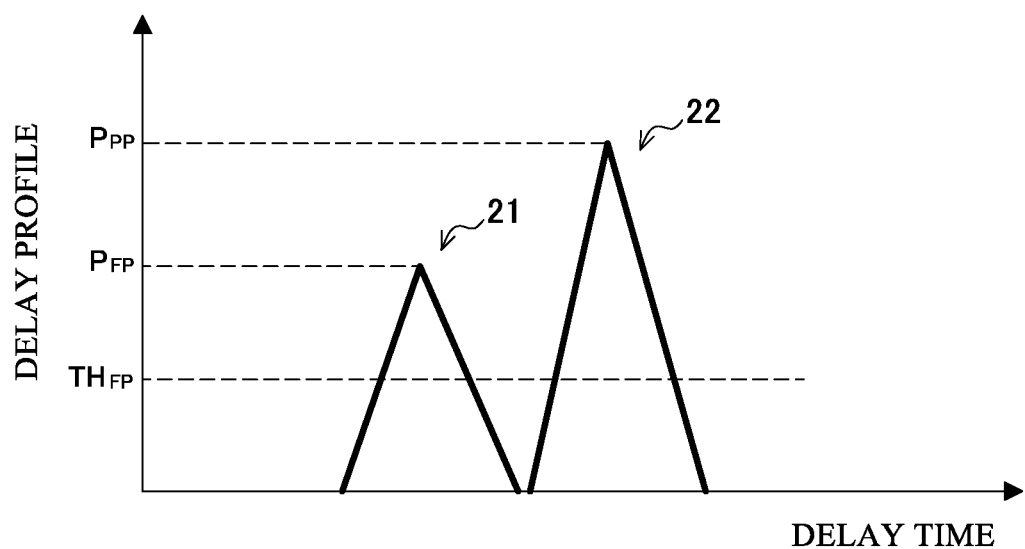
FIG. 12 is a graph illustrating an example of a CIR with regard to the wireless communication section in the NLOS condition.

Hereinafter, with reference to FIG. 11 and FIG. 12, the first path electric power and peak path electric power in the LOS condition and the NLOS condition will be described. FIG. 11 is a graph illustrating an example of a CIR with regard to the wireless communication section 210 in the LOS condition. FIG. 12 is a graph illustrating an example of a CIR with regard to the wireless communication section 210 in the NLOS condition. The graph includes a horizontal axis representing delay time. The graph includes a vertical axis representing absolute values of CIR values (such as electric power). The CIRs illustrated in FIG. 11 and FIG. 12 include a set 21 of elements corresponding to the direct wave, and a set 22 of elements corresponding to the delayed wave.

In the example illustrated in FIG. 11, the set 21 includes an element having a CIR value that exceeds the first path threshold $TH_{FP}$ for the first time. In other words, the set 21 corresponds to the first incoming wave. As illustrated in FIG. 11, in the case of the LOS condition, a peak of the whole CIR appears in the set 21 corresponding to the direct wave. Therefore, in the case of the LOS condition, the first path electric power $P_{FP}$ is typically identical to the peak path electric power $P_{PP}$. Note that, in the case where the first path electric power $P_{FP}$ and the peak path electric power $P_{PP}$ are calculated in different ways, the first path electric power $P_{FP}$ is substantially identical to the peak path electric power $P_{PP}$.

In the example illustrated in FIG. 12, the set 21 includes an element having a CIR value that exceeds the first path threshold $TH_{FP}$ for the first time. In other words, the set 21 corresponds to the first incoming wave. As illustrated in FIG. 12, in the case of the NLOS condition, a peak of the whole CIR appears in the set 22 corresponding to the delayed wave. This is because there is an obstacle in the first path in the case of the NLOS condition. In particular, if a human body is interposed in the first path, the direct wave drastically attenuates when the direct wave passes through the human body. Therefore, in the case of the NLOS condition, sometimes the first path electric power $P_{FP}$ may be significantly smaller than the peak path electric power $P_{PP}$.

As described above, the control section 230 determines that reliability gets higher as the first path electric power gets closer to the peak path electric power. On the other hand, the control section 230 determines that reliability gets lower as the first path electric power gets farther away from the peak path electric power. As described above, it is possible to evaluate the reliability from a viewpoint of a relative relation between the first path electric power $P_{FP}$ and the peak path electric power $P_{PP}$. Note that, the first path electric power and the peak path electric power have been described above with reference to FIG. 11 and FIG. 12, and the same applies to the first path amplitude and the peak path amplitude.

Therefore, among the respective reliability parameters calculated with regard to the plurality of wireless communication sections 210, the control section 230 treats a reliability parameter indicating that amplitude or electric power corresponding to the element having the CIR value that exceeds the first threshold for the first time in the CIR is closest to amplitude or electric power corresponding to the element having the maximum CIR value in the CIR, as the optimum parameter. For example, from among the plurality of wireless communication sections 210, the control section 230 selects a wireless communication section 210 having the first path amplitude that is closest to the peak path amplitude, as the master. For another example, from among the plurality of wireless communication sections 210, the control section 230 selects a wireless communication section 210 having the first path electric power that is closest to the peak path electric power, as the master.

Specifically, the control section 230 may calculate at least one of an amplitude ratio and an electric power ratio as the second reliability parameter. The amplitude ratio is a parameter indicating a result of comparing the first path amplitude with the peak path amplitude. The electric power ratio is a parameter indicating a result of comparing the first path electric power with the peak path electric power.

Next, an example of methods of calculating the amplitude ratio and the electric power ratio will be described. For example, the amplitude ratio and the electric power ratio may be calculated by using equations listed below.

Amplitude Ratio=First path Amplitude/Peak Path Amplitude

Amplitude Ratio=First path Amplitude−Peak Path Amplitude

Electric Power Ratio=First path Electric Power/Peak Path Electric Power

Electric Power Ratio=First path Electric Power−Peak Path Electric Power

From among the plurality of wireless communication sections 210, the control section 230 may select a wireless communication section 210 having a highest amplitude ratio, that is, the wireless communication section 210 having the first path amplitude that is closest to the peak path amplitude, as the master. Alternatively, from among the plurality of wireless communication sections 210, the control section 230 may select a wireless communication section 210 having a highest electric power ratio, that is, the wireless communication section 210 having the first path electric power that is closest to the peak path electric power, as the master. Such a configuration makes it possible to select a wireless communication section 210 that is most likely to be in the LOS condition, as the master. Therefore, it is possible to improve the accuracy of ranging rather than the case of selecting a wireless communication section 210 that is in the NLOS condition as the master.

Third Reliability Parameter

The reliability parameter may include a third reliability parameter that is time corresponding to an element having a CIR value that exceeds the first path threshold for the first time in a CIR. In other words, the reliability parameter may include the first path determination position.

Hereinafter, with reference to FIG. 13, first path determination positions with regard to the plurality of wireless communication sections 210 will be described. FIG. 13 is graphs illustrating an example of CIR s with regard to the plurality of wireless communication sections 210. A CIR 20A illustrated in FIG. 13 is a graph illustrating an example of a CIR with regard to the wireless communication section 210A in the LOS condition. A CIR 20B illustrated in FIG. 13 is a graph illustrating an example of a CIR with regard to the wireless communication section 210B in the NLOS condition. Each graph includes a horizontal axis representing delay time. It is assumed that a time axis of the CIR 20A is synchronous with a time axis of the CIR 20B. The graph includes a vertical axis representing absolute values of CIR values (such as electric power).

The CIR 20A includes a set 21A of elements corresponding to the direct wave, and a set 22A of elements corresponding to the delayed wave. With regard to the CIR 20A, the set 21A includes a first path determination position $T_{FP-A}$ having a CIR value that exceeds the first path threshold $TH_{FP}$ for the first time. In other words, the set 21A corresponds to the first incoming wave with regard to the CIR 20A.

The CIR 20B includes a set 21B of elements corresponding to the direct wave, and a set 22B of elements corresponding to the delayed wave. With regard to the CIR 20B, the set 22B includes a first path determination position $T_{FP-B}$ having a CIR value that exceeds the first path threshold $TH_{FP}$ for the first time. In other words, the set 22B corresponds to the first incoming wave with regard to the CIR 20B.

As illustrated in FIG. 13, the first path determination position $T_{FP\text{-}A}$ appears in the set 21A corresponding to the direct wave with regard to the wireless communication section 210A in the LOS condition. On the other hand, the first path determination position $T_{FP\text{-}B}$ may appear not in the set 21B corresponding to the direct wave, but in the set 22B corresponding to the delayed wave with regard to the wireless communication section 210B in the NLOS condition. In other words, it can be said that an early first path determination position indicates a high possibility of successfully detecting the direct wave as the first incoming wave. On the other hand, it can be said that a late first path determination position indicates a high possibility that detection of the direct wave as the first incoming wave ends in failure. Therefore, the control section 230 determines that reliability gets higher as an earlier first path determination position is obtained. On the other hand, the control section 230 determines that reliability gets lower as a later first path determination position is obtained. As described above, it is possible to evaluate the reliability from a viewpoint of the first path determination position.

Therefore, among the respective reliability parameters calculated with respect to the plurality of wireless communication sections 210, the control section 230 treats a reliability parameter indicating an earliest first path determination position, as the optimum parameter. In other words, from among the plurality of wireless communication sections 210, the control section 230 selects a wireless communication section 210 having the earliest first path determination position, as the master. Such a configuration makes it possible to select a wireless communication section 210 that is most likely to have successfully detected the direct wave as the first incoming wave, as the master. Therefore, it is possible to improve the accuracy of ranging rather than the case of selecting a wireless communication section 210 that has detected a wave other than the direct wave as the first incoming wave, as the master.

In the case of repeatedly performing the ranging process, the control section 230 may control whether to reselect the master on the basis of a difference between the first path determination position of the slave and the first path determination position of the master in a previous ranging process. For example, the control section 230 calculates a difference Tdif between the first path determination position of the master and an earliest first path determination position corresponding to one of the plurality of wireless communication sections 210, by using an equation listed below.

$$T\text{dif}=T_{FP\text{-}m}-\min(T_{FP\text{-}m},T_{FP\text{-}s1},T_{FP\text{-}s2},T_{FP\text{-}s3}) \quad (18)$$

Here, $T_{FP\text{-}m}$ is the first path determination position of the master. $T_{FP\text{-}s1}$, $T_{FP\text{-}s2}$, and $T_{FP\text{-}s3}$ are first path determination positions of respective slaves.

Next, the control section 230 may reselect a master in the case where the difference Tdif exceeds a predetermined threshold. When the difference Tdif exceeds the predetermined threshold, this means that the first path determination position of the master is a predetermined threshold or more behind the earliest first path determination position corresponding to one of the plurality of wireless communication sections 210. This means that the master is likely to have failed in detection of the direct wave as the first incoming wave but the slave is likely to have successfully detected the direct wave as the first incoming wave. Therefore, it is possible to improve the accuracy of ranging by reselect the slave having the earliest first path determination position as the master from among the plurality of wireless communication sections 210. Note that, for example, the predetermined threshold is a half of an ideal width obtained in the case where only the direct wave is detected as the first incoming wave.

Fourth Reliability Parameter

The reliability parameter may include a fourth reliability parameter derived from correlation between CIR waveforms of the wireless communication sections 210 in a pair.

Hereinafter, with reference to FIG. 14, CIR waveforms with regard to the plurality of wireless communication sections 210 will be described. FIG. 14 is graphs illustrating an example of CIRs with regard to the plurality of wireless communication sections 210. A CIR 20A illustrated in FIG. 14 is a graph illustrating an example of a CIR with regard to the wireless communication section 210A. A CIR 20B illustrated in FIG. 14 is a graph illustrating an example of a CIR with regard to the wireless communication section 210B. Each graph includes a horizontal axis representing delay time. It is assumed that the wireless communication section 210A and the wireless communication section 210B are in synchronization with each other. In other words, it is assumed that a time axis of the CIR 20A is synchronous with a time axis of the CIR 20B. The graph includes a vertical axis representing absolute values of CIR values (such as amplitude or electric power).

The CIR 20A includes a set 23A of elements corresponding to the combined wave received in a state where the direct wave is combined with the delayed wave having a different phase from the direct wave. The CIR waveform of the set 23A has two peaks because two waves having different phases are combined. With regard to the CIR 20A, the set 23A includes an element having a CIR value that exceeds the first path threshold $TH_{FP}$ for the first time. In other words, the set 23A corresponds to the first incoming wave with regard to the CIR 20A.

On the other hand, the CIR 20B includes a set 23B of elements corresponding to the combined wave received in a state where the direct wave is combined with the delayed wave having a same phase as the direct wave. The CIR waveform of the set 23 has a single large peak because two waves having the same phase are combined. With regard to the CIR 20B, the set 23B includes an element having a CIR value that exceeds the first path threshold $TH_{FP}$ for the first time. In other words, the set 23B corresponds to the first incoming wave with regard to the CIR 20B.

In the case where the plurality of wireless communication sections 210 receive signals in the state where the direct wave is combined with the delayed wave, the wireless communication sections 210 may have different relations of phases of the direct wave and the delayed wave even if a distance between the wireless communication sections 210 is short. As a result, different CIR waveforms are obtained as illustrated in the CIR 20A and CIR 20B. In other words, the different CIR waveforms between the wireless communication sections 210 in a pair mean that a combined wave is received by at least one of the wireless communication sections 210 in the pair. In the case where the combined wave is detected as the first incoming wave, the accuracy of angle estimation in the angle estimation process deteriorates as described above. In addition, in the case where the combined wave is detected as the first incoming wave, the accuracy of ranging in the ranging process deteriorates as described above.

Accordingly, the fourth reliability parameter may be a correlation coefficient between a CIR obtained on the basis of a reception signal received by a first wireless communication section 210 among the plurality of wireless communication sections 210, and a CIR obtained on the basis of a reception signal received by a second wireless communication section 210 that is different from the first wireless communication section 210 among the plurality of wireless communication sections 210. In other words, the fourth reliability parameter may be a correlation coefficient between a waveform of the entire CIR calculated with regard to the first wireless communication section 210 and a waveform of the entire CIR calculated with regard to the second wireless communication section 210. In addition, the control section 230 determines that reliability gets higher as the correlation coefficient increases. On the other hand, the control section 230 determines that reliability gets lower as the correlation coefficient decreases. Such a configuration makes it possible to evaluate reliability from a viewpoint of correlation between CIR waveforms.

Here, a phase of the first incoming wave is used for the angle estimation process. Therefore, the reliability parameter may be derived from correlation between CIR waveforms close to the first incoming wave.

Accordingly, the fourth reliability parameter may be a correlation coefficient between chronological change in CIR value of a portion including the element having the CIR value that exceeds the first path threshold for the first time in a CIR obtained on the basis of a reception signal received by the first wireless communication section 210 among the plurality of wireless communication sections 210, and chronological change in CIR value of a portion including the element having the CIR value that exceeds the first path threshold for the first time in a CIR obtained on the basis of a reception signal received by the second wireless communication section 210 that is different from the first wireless communication section 210 among the plurality of wireless communication sections 210. Here, the portion means a set including the element having the CIR value that exceeds the first path threshold for the first time, and one or more elements that exist before and/or after such an element in the time axis direction. In other words, the fourth reliability parameter may be a correlation coefficient between a waveform obtained in a vicinity of a first path determination position in the CIR calculated with regard to the first wireless communication section 210, and a waveform obtained in a vicinity of a first path determination position in the CIR calculated with regard to the second wireless communication section 210. In addition, the control section 230 determines that reliability gets higher as the correlation coefficient increases. On the other hand, the control section 230 determines that reliability gets lower as the correlation coefficient decreases. Such a configuration makes it possible to evaluate reliability from a viewpoint of correlation between CIR waveforms obtained in the vicinity of the first incoming wave. In addition, such a configuration makes it possible to reduce an amount of calculation in comparison with the case of correlating waveforms of the whole CIRs.

The control section 230 treats a highest correlation coefficient as the optimum parameter among correlation coefficients calculated with regard to the plurality of the pairs of the wireless communication sections 210. Specifically, the control section 230 selects one of two wireless communication sections 210 included in the pair from which the highest correlation coefficient is calculated as the master, among correlation coefficients calculated with regard to the plurality of the pairs of the wireless communication sections 210. Such a configuration makes it possible to select a wireless communication section 210 that is unlikely to have detected the combined wave as the first incoming wave, that is, the wireless communication section 210 that is most likely to have successfully detected the direct wave as the first incoming wave, as the master. This makes it possible to improve the accuracy of ranging rather than the case of detecting the combined wave as the first incoming wave.

Note that, the correlation coefficient may be the Pearson correlation coefficient, for example.

The CIR may include amplitude or electric power, which is a CIR value, as an element obtained at each time. In this case, the control section 230 calculates a correlation coefficient by correlating respective amplitudes or electric powers obtained at corresponding times, which are included in the two CIRs. Note that, the corresponding times indicate a same time in an environment where the time axes of the two CIRs are synchronous with each other.

The CIR may include a complex number, which is a CIR value, as the element obtained at each time. In this case, the control section 230 calculates a correlation coefficient by correlating respective complex numbers obtained at corresponding times, which are included in the two CIRs. The complex number includes a phase component in addition to an amplitude component. Therefore, it is possible to calculate a more accurate correlation coefficient than the case of calculating a correlation coefficient on the basis of amplitude or electric power.

Fifth Reliability Parameter

The fifth reliability parameter is an indicator that indicates whether the first incoming wave itself is appropriate for the detection target. In other words, the fifth reliability parameter is an indicator that indicates whether the specific element itself is appropriate for the detection target. Higher reliability is obtained as the first incoming wave is more appropriate for the detection target, and lower reliability is obtained as the first incoming wave is more inappropriate for the detection target.

Specifically, the fifth reliability parameter may be an indicator that indicates magnitude of noise. In this case, the fifth reliability parameter is calculated on the basis of at least any of a signal-to-noise ratio (SNR) and electric power of the first incoming wave. In the case where the electric power is high, effects of the noise are small. Therefore, the fifth reliability parameter indicating that the first incoming wave is appropriate for the detection target is calculated. On the other hand, in the case where the electric power is low, effects of the noise are large. Therefore, the fifth reliability parameter indicating that the first incoming wave is inappropriate for the detection target is calculated. In the case where the SNR is high, the effects of the noise are small. Therefore, the fifth reliability parameter indicating that the first incoming wave is appropriate for the detection target is calculated. On the other hand, in the case where the SNR is low, effects of the noise are large. Therefore, the fifth reliability parameter indicating that the first incoming wave is inappropriate for the detection target is calculated.

By using the fifth reliability parameter, it is possible to evaluate reliability on the basis of whether the first incoming wave itself is appropriate for the detection target.

Sixth Reliability Parameter

The sixth reliability parameter is an indicator that indicates unsuitability of a combined wave for the first incoming wave. In other words, the sixth reliability parameter is an indicator that indicates unsuitability of the combined wave for the specific element. Higher reliability is obtained as the unsuitability of the combined wave for the first incoming wave gets higher, and lower reliability is obtained as the suitability of the combined wave for the first incoming wave gets lower.

Specifically, the sixth reliability parameter is calculated on the basis of at least any of width of the first incoming wave in the time direction and a state of the phase of the first incoming wave.

First, with reference to FIG. 15, calculation of the sixth reliability parameter based on the width of the first incoming wave in the time direction will be described. Here, the width of the first incoming wave in the time direction may be width of a set of elements corresponding to the first incoming wave in the time direction, with regard to the CIR.

Figure 15:
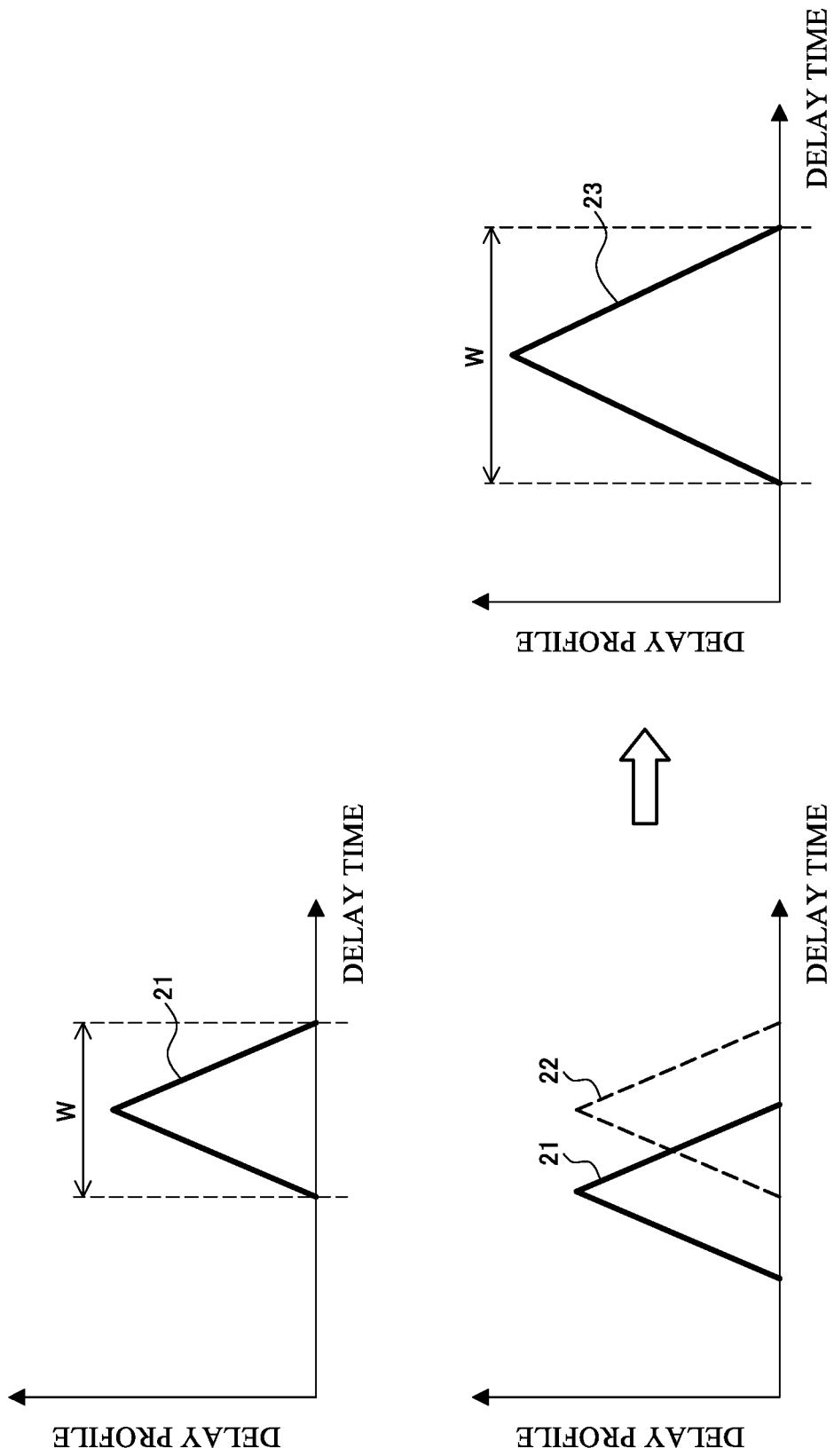
FIG. 15 is diagrams for describing examples of a reliability parameter according to the embodiment.

FIG. 15 is diagrams for describing examples of the reliability parameter according to the present embodiment. In the case where the direct wave is independently received as illustrated in the top of FIG. 15, width W of a set 21 of elements corresponding to the direct wave in the CIR serves as an ideal width obtained when only the direct wave is detected as the first incoming wave. Here, the width W is width of a set of elements corresponding to a single pulse in the time direction. For example, the width W is width between a zero-crossing and another zero-crossing. For another example, the width W is width between intersections of a standard and varied CIR values. On the other hand, when the wireless communication sections 210 receive signals in a state where the plurality of pulses coming through different paths are combined due to effects of multipath, the width W of a set of elements corresponding to the combined wave in the CIR may be different from the ideal width obtained when only the direct wave is detected as the first incoming wave. For example, when a direct wave and a delayed wave are received in such a manner that the delayed wave having a same phase as the direct wave is combined with the direct wave as illustrated in the bottom of FIG. 15, the set 21 of elements corresponding to the direct wave and the set 22 of elements corresponding to the delayed wave are added in a state where they are shifted in the time direction. Therefore, the set 23 of elements corresponding to the combined wave in the CIR has a wide width W. On the other hand, when a direct wave and a delayed wave are received in such a manner that the delayed wave having an opposite phase from the direct wave is combined with the direct wave, the direct wave and the delayed wave annihilate each other. Therefore, a set of elements corresponding to the combined wave in the CIR has a narrow width W.

As described above, the sixth reliability parameter is calculated in such a manner that the sixth reliability parameter indicates that the unsuitability of the combined wave for the first incoming wave gets higher as a difference between the width of the first incoming wave and the ideal width obtained when only the direct wave is detected as the first incoming wave gets smaller. On the other hand, the sixth reliability parameter is calculated in such a manner that the sixth reliability parameter indicates that the unsuitability of the combined wave for the first incoming wave gets lower as the difference between the width of the first incoming wave and the ideal width obtained when only the direct wave is detected as the first incoming wave gets larger.

Next, with reference to FIG. 16, calculation of the sixth reliability parameter based on a state of phase of the first incoming wave will be described. Here, the state of the phase of the first incoming wave may be a degree of difference in phase between elements corresponding to the first incoming wave with regard to the received wireless signal. Alternatively, the state of the phase of the first incoming wave may be a degree of difference in phase between elements corresponding to the first incoming wave with regard to the CIR.

FIG. 16 is diagrams for describing examples of the reliability parameter according to the present embodiment. In the case where the direct wave is independently received as illustrated in the top of FIG. 16, respective phases θ of a plurality of elements belonging to the set 21 of elements corresponding to the direct wave in the CIR are a same or substantially same phases (that is, θ1≈θ2≈θ3). Note that, the phase is an angle between IQ components of a CIR and an I axis on an IQ plane. This is because distances of paths of direct waves are the same with regard to the respective elements. On the other hand, in the case where the combined wave is received as illustrated in the bottom of FIG. 16, respective phases θ of a plurality of elements belonging to the set 23 of elements corresponding to the combined wave in the CIR are different phases (that is, θ1≠θ2≠θ3). This is because pulses having different distances between the transmitter and the receivers, that is, the pulses having different phases are combined. As described above, the sixth reliability parameter is calculated in such a manner that the sixth reliability parameter indicates that the unsuitability of the combined wave for the first incoming wave gets higher as the difference between the phases of elements corresponding to the first incoming wave gets smaller. On the other hand, the sixth reliability parameter is also calculated in such a manner that the sixth reliability parameter indicates that the unsuitability of the combined wave for the first incoming wave gets lower as the difference between the phases of the elements corresponding to the first incoming wave gets larger.

By using the sixth reliability parameter, it is possible to evaluate the reliability on the basis of the unsuitability of the combined wave for the first incoming wave.

Seventh Reliability Parameter

The reliability parameter may include a seventh reliability parameter that is a difference between time corresponding to a first element and time corresponding to a second element of the CIR. The first element has a peak CIR value for the first time after the specific element, and the second element has a peak CIR value for the second time after the specific element. Details of the seventh reliability parameter will be described with reference to FIG. 17 and FIG. 18.

Figure 17:
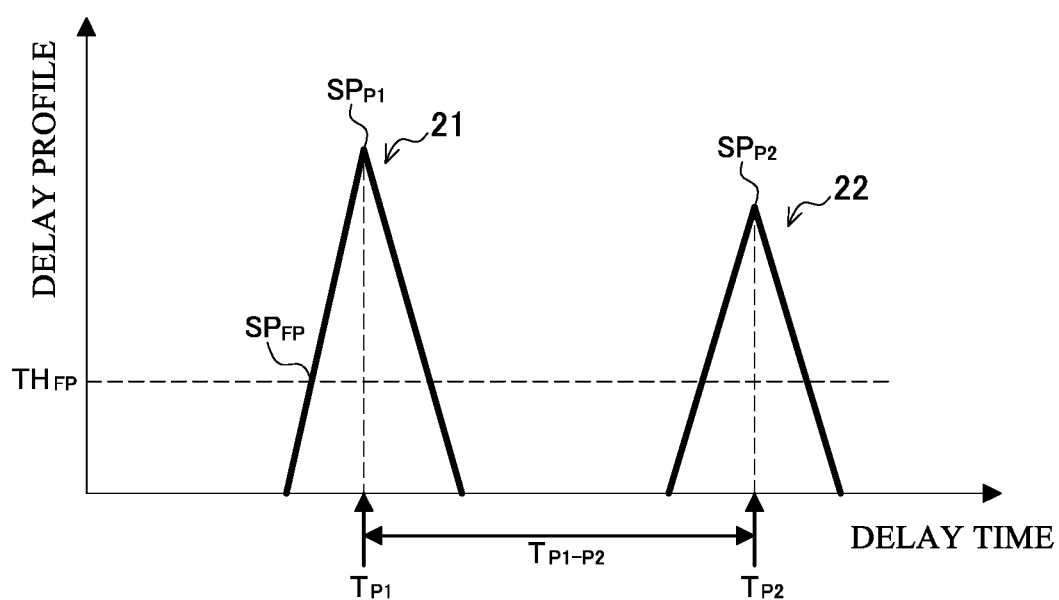
FIG. 17 is a graph illustrating an example of a CIR.
Figure 18:
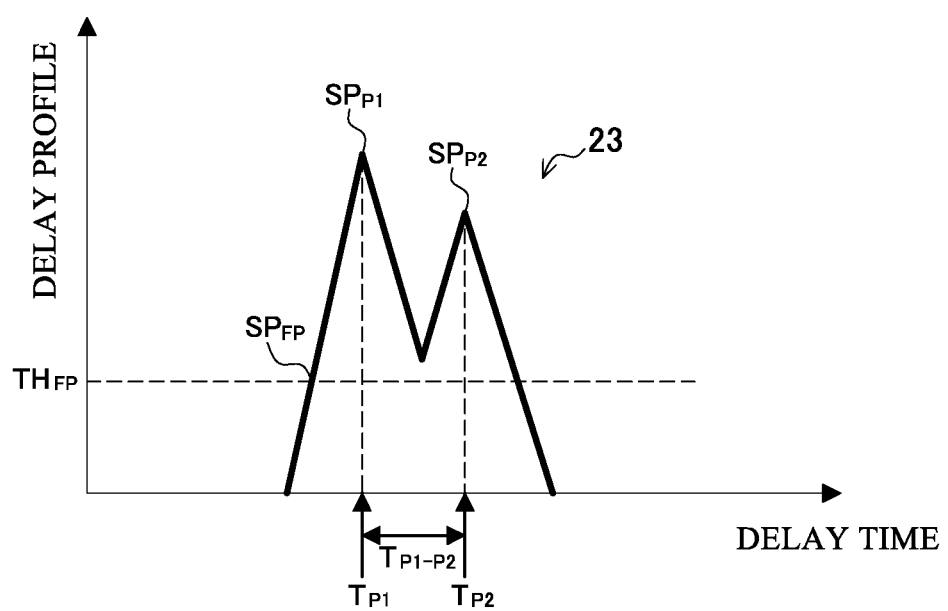
FIG. 18 is a graph illustrating an example of a CIR.

FIG. 17 and FIG. 18 are graphs illustrating examples of the CIRs. The graph includes a horizontal axis representing delay time. The graph includes a vertical axis representing absolute values of CIR values (such as electric power or amplitude).

The CIR illustrated in FIG. 17 include a set 21 of elements corresponding to the direct wave, and a set 22 of elements corresponding to the delayed wave. The set 21 includes a specific element $SP_{FP}$ that is an element whose CIR value exceeds the first path threshold $TH_{FP}$ for the first time. In other words, the set 21 corresponds to the first incoming wave. The set 21 includes a first element $SP_{P1}$ having a peak CIR value for the first time after the specific element $SP_{FP}$. On the other hand, the set 22 includes a second element $SP_{P2}$ having a peak CIR value for the second time after the specific element $SP_{FP}$.

The CIR illustrated in FIG. 18 includes a set 23 of elements corresponding to the combined wave received in a state where the direct wave is combined with the delayed wave having a different phase from the direct wave. The CIR waveform of the set 23 has two peaks because two waves having different phases are combined. The set 23 includes a specific element $SP_{FP}$ that is an element whose CIR value exceeds the first path threshold $TH_{FP}$ for the first time. In other words, the set 23 corresponds to the first incoming wave. The set 23 includes a first element $SP_{P1}$ having a peak CIR value for the first time after the specific element $SP_{FP}$. The set 23 includes a second element $SP_{P2}$ having a peak CIR value for the second time after the specific element $SP_{FP}$.

In the case where the direct wave is detected as the first incoming wave, the first incoming wave has a CIR waveform with a single peak as illustrated in FIG. 17. On the other hand, in the case where the combined wave is detected as the first incoming wave, the first incoming wave may have a CIR waveform with multiple peaks as illustrated in FIG. 18. In addition, it is possible to determine whether the first incoming wave has the CIR waveform with the single peak or the multiple peaks on the basis of a difference $T_{P1-P2}$ between the time $T_{P1}$ corresponding to the first element $SP_{P1}$ and the time $T_{P2}$ corresponding to the second element $SP_{P2}$. This is because a large difference $T_{P1-P2}$ is obtained in the case where the first incoming wave has the CIR waveform with the single peak. In addition, a smaller difference $T_{P1-P2}$ is obtained in the case where the first incoming wave has the CIR waveform with the multiple peaks.

In the case where the combined wave is detected as the first incoming wave, accuracy of estimating the positional parameter deteriorates in comparison with the case where the direct wave is detected as the first incoming wave. Therefore, it can be said that the larger difference $T_{P1-P2}$ means higher reliability. As described above, it is possible to evaluate reliability by using the difference $T_{P1-P2}$. The difference $T_{P1-P2}$ is the seventh reliability parameter.

Eighth Reliability Parameter

The eighth reliability parameter is an indicator that indicates suitability of a direct wave for the first incoming wave. In other words, the eighth reliability parameter is an indicator that indicates suitability of the specific element for an element corresponding to the direct wave. Higher reliability is obtained as the suitability of the direct wave for the first incoming wave gets higher, and lower reliability is obtained as the suitability of the direct wave for the first incoming wave gets lower.

The eighth reliability parameter may be calculated on the basis of consistency between the respective first incoming waves that are detected with regard to the plurality of the wireless communication sections 210. Specifically, the eighth reliability parameter is calculated on the basis of at least any of reception time and electric power of the first incoming wave detected with regard to each of the plurality of wireless communication sections 210. Due to the effect of multipath, a plurality of wireless signals coming through different paths may be combined and received by the wireless communication sections 210 in a state where the signals are amplified or offset. Next, in the case where ways of amplifying and offsetting the wireless signals are different between the plurality of wireless communication sections 210, different reception times and different electric power values may be obtained with regard to the first incoming waves between the wireless communication sections 210. When considering that distances between the antennas 211 are short distances that are a half or less of the wavelength $\lambda$ of the angle estimation signal, a large difference in the reception times and electric power values of the first incoming waves between the wireless communication sections 210 means low suitability of the direct waves for the first incoming waves.

In addition, the eighth reliability parameter is calculated in such a manner that the eighth reliability parameter indicates that the suitability of the direct wave for the first incoming wave gets lower as the difference in reception time of the first incoming wave between the wireless communication sections 210 gets larger. On the other hand, the eighth reliability parameter is calculated in such a manner that the eighth reliability parameter indicates that the suitability of the direct waves for the first incoming waves gets higher as the difference in reception time of the first incoming wave between the wireless communication sections 210 gets smaller. In addition, the eighth reliability parameter is calculated in such a manner that the eighth reliability parameter indicates that the suitability of the direct wave for the first incoming wave gets lower as the difference in electric power value of the first incoming wave between the wireless communication sections 210 gets larger. On the other hand, the eighth reliability parameter is calculated in such a manner that the eighth reliability parameter indicates that the suitability of the direct wave for the first incoming wave gets higher as the difference in electric power value of the first incoming wave between the wireless communication sections 210 gets smaller.

The eighth reliability parameter may be calculated on the basis of consistency between positional parameters indicating positions of the portable device 100 estimated on the basis of the respective first incoming waves detected by the plurality of wireless communication sections 210. Here, the positional parameters are the angles $\alpha$ and $\beta$ illustrated in FIG. 3 and the coordinates (x, y, z) illustrated in FIG. 4. The positional parameters are estimated on the basis of the first incoming waves with regard to combinations of the wireless communication sections 210. In the case where the first incoming waves are the direct waves, same or substantially same results are obtained with regard to the angles $\alpha$ and $\beta$ and the coordinates (x, y, z) even if different combinations of the wireless communication sections 210 are used for calculating the angles $\alpha$ and $\beta$ and the coordinates (x, y, z). However, in the case where the first incoming waves are not the direct waves, different results may be obtained from the different combinations of the wireless communication sections 210 with regard to the angles $\alpha$ and $\beta$ and the coordinates (x, y, z).

Accordingly, the eighth reliability parameter is calculated in such a manner that the eighth reliability parameter indicates that the suitability of the direct waves for the first incoming waves gets higher as the difference in positional parameter calculation result between different combinations of the wireless communication sections 210 gets smaller. For example, the eighth reliability parameter is calculated in such a manner that the eighth reliability parameter indicates that the suitability of the direct waves for the first incoming waves gets higher as an error between $\alpha_{AC}$ and $\alpha_{BD}$ gets smaller and as an error between $\beta_{DC}$ and PBA gets smaller. These errors have been described above with regard to the angle estimation process. On the other hand, the eighth reliability parameter is calculated in such a manner that the eighth reliability parameter indicates that the suitability of the direct waves for the first incoming waves gets lower as the difference in positional parameter calculation result between different combinations of the wireless communication sections 210 gets larger. For example, the eighth reliability parameter is calculated in such a manner that the eighth reliability parameter indicates that the suitability of direct waves for the first incoming waves gets lower as an error between $\alpha_{AC}$ and $\alpha_{BD}$ gets larger and as an error between $\beta_{DC}$ and PBA gets larger. These angles have been described above with regard to the angle estimation process.

By using the eighth reliability parameter, it is possible to evaluate the reliability on the basis of the suitability of the direct waves for the first incoming waves.

Ninth Reliability Parameter

The ninth reliability parameter is an indicator that indicates suitability of a situation of receiving the wireless signal. Higher reliability is obtained when the suitability of the situation of receiving the wireless signal is higher, and lower reliability is obtained when the suitability of the situation of receiving the wireless signal is lower.

The ninth reliability parameter is calculated on the basis of variation of the plurality of first incoming waves that have been acquired by detecting the first incoming wave multiple times. Specifically, the ninth reliability parameter is calculated on the basis of an amount of statistics that indicates variation in the plurality of first incoming waves such as dispersion of the electric power value of the first incoming waves, and amounts of dispersion and change in the estimated positional parameter (distance R, angles $\alpha$ and $\beta$, and coordinates (x, y, z)). Note that, the amount of change in the positional parameters means integration of a difference between a previously estimated positional parameter and a currently estimated positional parameter, a difference between a maximum value and a minimum value, or the like. As the dispersion and the amount of change get larger, environmental change increases in a time period of receiving the wireless signal multiple times. Therefore, the ninth reliability parameter is calculated in such a manner that the ninth reliability parameter indicates that the suitability of a state of receiving a wireless signal gets higher as the dispersion and the amount of change get smaller. On the other hand, the ninth reliability parameter is calculated in such a manner that the ninth reliability parameter indicates that the suitability of the state of receiving the wireless signal gets lower as the dispersion and the amount of change get larger. In addition, examples of the amount of statistics indicating variation in the plurality of first incoming waves include a phase difference Pd between the first incoming waves, a width W of the first incoming wave in the time direction, a state of a phase $\theta$ of the first incoming wave, and an amount of change and dispersion of SNR of the first incoming wave.

By using the ninth reliability parameter, it is possible to evaluate the reliability on the basis of the suitability of the state of receiving the wireless signal. Specifically, it is possible to determine that higher reliability is obtained as environmental change decreases in the time period of receiving the wireless signal multiple times, and lower reliability is obtained as the environmental change increases. In addition, it is possible to determine that higher reliability is obtained in a low noise situation, and lower reliability is obtained in a high noise situation.

<4.3. Determination of Positional Parameter>

The communication unit 200 (specifically, control section 230) control a repetition process of repeatedly performing a measurement process. In the repetition process, the communication unit 200 controls the selection process. Next, the communication unit 200 performs a positional parameter determination process on the basis of the first incoming waves (that is, specific elements) obtained through the repetition process. Next, details of the measurement process, the repetition process, the selection process, and the positional parameter determination process will be described.

(1) Measurement Process

The measurement process includes transmission of a signal from a representative wireless communication section, which is a wireless communication section 210 selected from among the plurality of wireless communication sections 210. The master is an example of the representative wireless communication section. The second ranging signal transmitted from the master is an example of the signal transmitted from the representative wireless communication section.

The measurement process may include reception of the signal from the representative wireless communication section, as a stage prior to the transmission of the signal from the representative wireless communication section. The first ranging signal transmitted from the master is an example of the signal received by the representative wireless communication section.

The measurement process includes reception of the signal by the plurality of wireless communication sections 210. The angle estimation signal, which also serves as the third ranging signal, is an example of the respective signals received by the plurality of wireless communication sections 210.

The series of communication may also be referred to as position estimation communication.

The measurement process includes calculation of a first parameter belonging to the reliability parameter with regard to at least any of the wireless communication sections 210. The reliability parameter serves as an indicator that indicates whether a first incoming wave is appropriate for a processing target. The first incoming wave is a signal detected as a signal that meets a predetermined detection standard among signals received by the wireless communication section 210 through the position estimation communication. All of the above-described reliability parameters, that is, the first reliability parameter to the ninth reliability parameter are examples of the first parameter. The control section 230 detects the first incoming wave from a signal received by at least any of the wireless communication sections 210, and calculates the first parameter with regard to the detected first incoming wave. Such a configuration makes it possible to evaluate whether the first incoming wave detected in the measurement process is appropriate for a processing target.

Note that, the position estimation communication may be performed one time in the single measurement process. In other words, the communication unit 200 may receive the wireless signals (for example, angle estimation signals that also serve as the third ranging signals) from the plurality of wireless communication sections 210 one time in the single measurement process. In this case, a single combination of the first incoming wave and the reliability parameter can be obtained through the single measurement process. Alternatively, the position estimation communication may be performed multiple times in the single measurement process. In other words, the communication unit 200 may receive the wireless signals (for example, angle estimation signals that also serve as the third ranging signals) from the plurality of wireless communication sections 210 multiple times in the single measurement process. In this case, a plurality of combinations of the first incoming wave and the reliability parameter can be obtained through the single measurement process.

Typically, after the repetition process, the positional parameter estimation process is performed on the basis of the first incoming wave detected through the measurement process. Of course, the positional parameter estimation process may be performed in the measurement process. This is because the positional parameter may be used for calculating the eighth reliability parameter and the ninth reliability parameter.

(2) Repetition Process and Positional Parameter Determination Process

The communication unit 200 controls the repetition process of repeatedly performing the measurement process, on the basis of the first parameter calculated through the measurement process. Specifically, the communication unit 200 determines whether to continue or stop repeating the measurement process, on the basis of the first parameter. The number of repetitions may be one. In other words, the communication unit 200 may perform the measurement process just one time and does not have to repeat the measurement process. Of course, the number of repetitions may be two or more (multiple times). Such a configuration allows the communication unit 200 to control the wireless communication in accordance with a radio propagation environment, by repeatedly performing the measurement process until the first incoming wave having higher reliability is obtained, or by performing other processes.

Normal Repetition Process

The communication unit 200 continues the repetition process until the number of first incoming waves corresponding to the first parameter that meets a predetermined standard reaches a first predetermined number. In other words, the communication unit 200 stops the repetition process when the number of first incoming waves corresponding to the first parameter that meets the predetermined standard reaches the first predetermined number. For example, the predetermined standard is that the reliability is higher than a predetermined threshold. In this case, the communication unit 200 repeatedly performs the measurement process until the number of first incoming waves corresponding to the first parameter that indicates higher reliability than the predetermined threshold reaches the first predetermined number. This makes it possible to assure accuracy of the positional parameter determined through the positional parameter determination process (to be described later). Note that, the first predetermined number is any number as long as it is one or more. In addition, hereinafter, the predetermined standard is also referred to as a reliability standard, and the first incoming wave corresponding to the first parameter that meets the predetermined standard is also referred to as the first incoming wave that meets the reliability standard.

Positional Parameter Determination Process

In the case where the repetition process is stopped, the communication unit 200 controls a position determination process of determining the positional parameter indicating the position of the portable device 100 on the basis of the first incoming wave obtained through the measurement process. Specifically, the communication unit 200 determines the positional parameter of the portable device 100 on the basis of the one or more first incoming waves obtained through the measurement processes performed during the repetition process. This allows the communication unit 200 to acquire the positional parameter of the portable device 100.

In particular, the communication unit 200 determines the positional parameter on the basis of a first incoming wave that meets the reliability standard. Specifically, the communication unit 200 determines the positional parameter on the basis of the first predetermined number of first incoming waves corresponding to the first parameters that meet the reliability standard, which have been obtained through the repetition process. Such a configuration makes it possible to determine the highly accurate positional parameter.

Specifically, in the case where the first predetermined number is one, the above-described positional parameter estimation process corresponds to the positional parameter determination process. On the other hand, in the case where the first predetermined number is two or more, the communication unit 200 determines the positional parameter in the positional parameter determination process by applying a statistical process based on the first parameter, to a plurality (that is, the first predetermined number) of positional parameters estimated through the positional parameter estimation process on the basis of the plurality of first incoming waves. Specifically, the communication unit 200 estimates the plurality of positional parameters by performing the positional parameter estimation process on the plurality of first incoming waves detected through the repetition process. Next, the communication unit 200 determines, as the positional parameter, a representative value derived from the plurality of estimated positional parameters on the basis of the first parameter.

For example, the communication unit 200 may determine the positional parameter by adopting a positional parameter estimated on the basis of a first incoming wave corresponding to the first parameter representing highest reliability. For another example, the communication unit 200 may determine the positional parameter by averaging the plurality of estimated positional parameters through weighted averaging based on the first parameter. At this time, a heavier weight is given to a positional parameter estimated on the basis of the first incoming wave corresponding to the first parameter representing high reliability, and a lighter weight is given to a positional parameter estimated on the basis of a first incoming wave corresponding to a reliability parameter representing low reliability. For another example, the communication unit 200 may determine the positional parameter by averaging or calculating a median of a plurality of estimated positional parameters other than positional parameters estimated on the basis of first incoming waves corresponding to first parameters representing low reliability. Note that, such statistical processes may be applicable in combination. Such a configuration makes it possible to determine a highly accurate positional parameter.

The communication unit 200 may determine a region including the portable device 100 in the position determination process. The communication unit 200 determines the region including the portable device 100 on the basis of the positional parameter (for example, at least any of a distance R, angles $\alpha$ and $\beta$, and coordinates (x, y, z)) determined through the above-described process. For example, the communication unit 200 may determine the region including the portable device 100 among the plurality of regions including the vehicle interior and the vehicle exterior of the vehicle 202. This makes it possible to provide courteous service such as providing different serves between the case where the user is in the vehicle interior and the case where the user is in the vehicle exterior. In addition, the communication unit 200 may determine the region including the portable device 100 after segmenting the vehicle exterior region into a region within a predetermined distance from the communication unit 200, and a region that is the predetermined distance or more away from the communication unit 200.

For example, the determined region including the portable device 100 is used for authentication of the portable device 100. According to the present embodiment, it is possible to improve accuracy of the determined positional parameters. This makes it possible to prevent erroneous authentication and improve security.

Note that, sometimes the positional parameter estimation process has already been performed in the measurement process because of calculation of the first parameter. In this case, the communication unit 200 does not perform the positional parameter estimation process again in the positional parameter determination process, but may use a positional parameter estimated through the positional parameter estimation process performed in the measurement process. On the other hand, in the case where the positional parameter estimation process has not been performed in the measurement process, the communication unit 200 performs the positional parameter estimation process in the positional parameter determination process.

Exceptional Repetition Process

The communication unit 200 may also stop the repetition process even in the case where the number of first incoming waves that meet the reliability standard does not reach the first predetermined number. For example, in the case where the number of repetitions of the measurement process in the repetition process reaches a second predetermined number, the communication unit 200 stops the repetition process. This makes it possible to prevent the process from being trapped in a semi-permanent loop, and it is possible to reduce wasted electric power consumption.

Subsequently, the communication unit 200 may determine the positional parameter on the basis of information obtained until the repetition process is stopped. Specifically, the communication unit 200 may determine the positional parameter on the basis of the first incoming waves obtained through the measurement processes performed during the repetition process. For example, the communication unit 200 may determine the positional parameter on the basis of the first incoming wave that meets the reliability standard, or may determine the positional parameter on the basis of all the first incoming waves including a first incoming wave that does not meet the reliability standard. The above-described positional parameter determination process is also applied to this case in a similar way.

On the other hand, the communication unit 200 does not have to determine the positional parameter in the positional parameter determination process after the repetition process is stopped. In this case, information indicating that the determination ends in failure is output in the positional parameter determination process. This makes it possible to avoid a situation of determining a positional parameter with flagrant error in the case where the reliability is extremely low.

(4) Selection Process

The communication unit 200 controls the selection process of selecting the representative wireless communication section from among the plurality of wireless communication sections 210 each time the measurement process is repeated in the repetition process. For example, the communication unit 200 selects any wireless communication section 210 as the master and performs a first measurement process. Before performing second and subsequent measurement processes, the communication unit 200 may select a master again. Such a configuration makes it possible to perform the measurement process by selecting a master that is evaluated as an appropriate processing target. Therefore, it is possible to improve accuracy of estimating a positional parameter.

In the selection process, the control unit 200 determines whether or not to change the representative wireless communication section, on the basis of a second parameter belonging to the reliability parameter calculated with regard to the representative wireless communication section. For example, the communication unit 200 may determine to change the master in the case where the second parameter is calculated with regard to the master and the second parameter indicates lower reliability than a predetermined threshold. On the other hand, the communication unit 200 may determine not to change the master in the case where the second parameter is calculated with regard to the master and the second parameter indicates higher reliability than the predetermined threshold. For another example, the communication unit 200 may determine to change the master in the case where reliability indicated by a second parameter, which is calculated with regard to the master, is lower than reliability indicated by a second parameter, which is calculated with regard to any of slaves. On the other hand, the communication unit 200 may determine not to change the master in the case where reliability indicated by a second parameter, which is calculated with regard to the master, is higher than reliability indicated by second parameters, which are calculated with regard to every slave. Such a configuration makes it possible to determine whether or not it is necessary to change the master on the basis of whether or not the first incoming wave detected with regard to the master is appropriate for the processing target, that is, on the basis of accuracies of estimation of possible positional parameters.

In the selection process, the control unit 200 selects a wireless communication section 210 for which a second parameter indicating that the wireless communication section 210 is most appropriate for the processing target is calculated, as the representative wireless communication section, from among the second parameters calculated with regard to the respective wireless communication sections 210 in the case of determining to change the representative wireless communication section. For example, the communication unit 200 selects a wireless communication section 210 for which a second parameter with the highest reliability is calculated, as the maser, from among the second parameters calculated with regard to the plurality of wireless communication sections 210. Such a configuration makes it possible to perform a next measurement process while a wireless communication section 210 for which a first incoming wave that is most appropriate for the processing target has been detected is used as the master. This makes it possible to improve accuracy of estimating a positional parameter.

Among the reliability parameters, the second parameter is an indicator indicating whether the first incoming wave detected with regard to one of the wireless communication sections 210 is appropriate for the processing target. Among the above-described reliability parameters, the first reliability parameter to the seventh reliability parameter are examples of the second parameter. Note that, like the fourth reliability parameter, reliability parameters calculated with regard to the plurality of wireless communication sections 210 are deemed to be respective reliability parameters calculated with regard to the plurality of wireless communication sections 210. Such a configuration makes it possible to determine whether or not it is necessary to change the master, on the basis of whether or not the first incoming wave detected with regard to the master is appropriate for the processing target.

The first parameter may be the same as the second parameter. In this case, the first parameter calculated through the measurement process can be used as the second parameter in the selection process. Therefore, it is possible to reduce processing load.

Of course, the first parameter may be different from the second parameter. In this case, the second parameter, which is different from the first parameter, is calculated in the selection process.

<4.4. Flow of Process>

1) First Example

Figure 19:
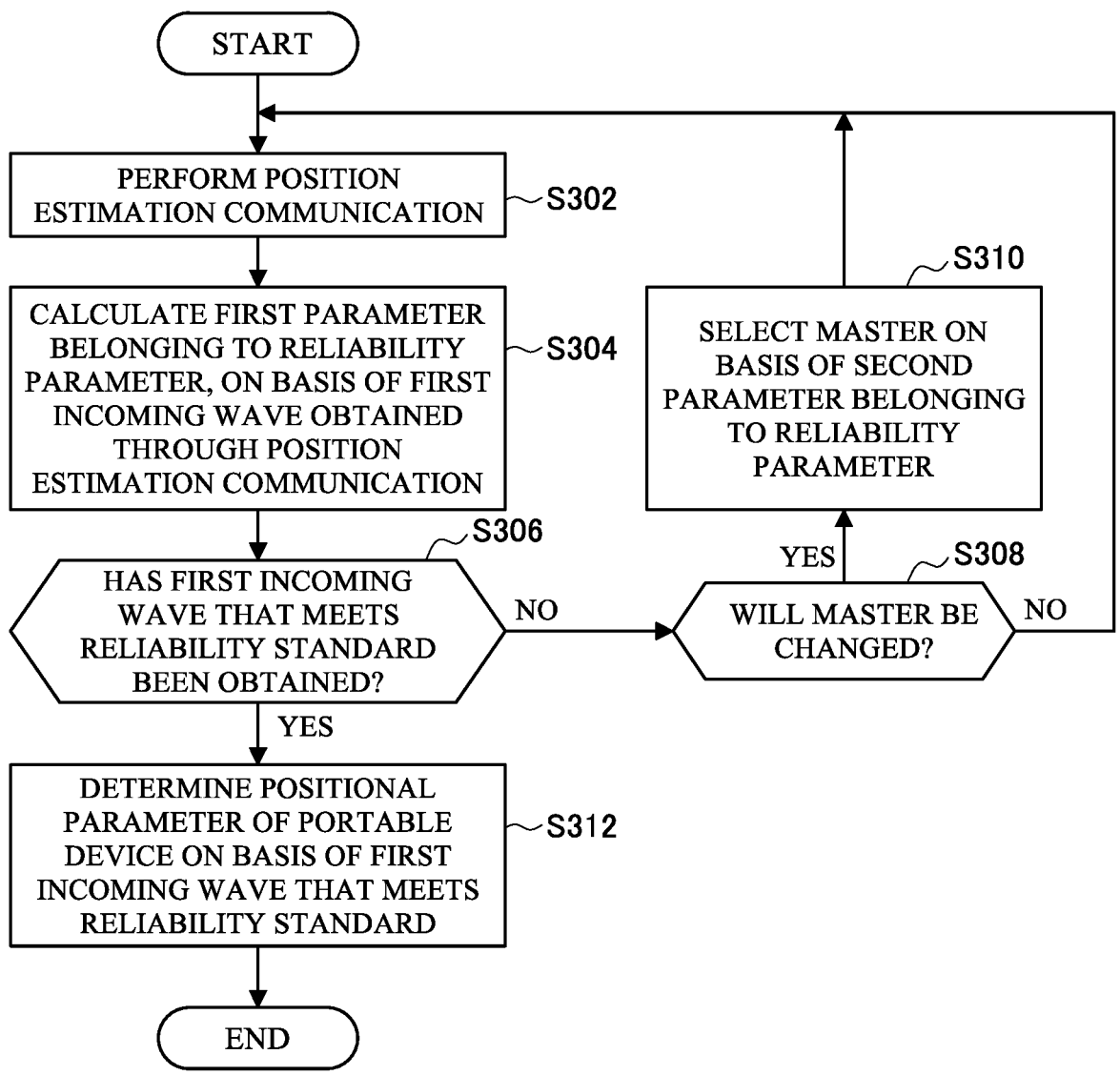
FIG. 19 is a flowchart illustrating an example of a flow of a process performed by the communication unit of the vehicle according to the embodiment.

FIG. 19 is a flowchart illustrating an example of a flow of a process performed by the communication unit 200 of the vehicle 202 according to the present embodiment. According to this flowchart, it is assumed that position estimation communication is performed one time in the single measurement process, and the first predetermined number is one.

As illustrated in FIG. 19, the communication unit 200 first performs the position estimation communication (Step S302). For example, the portable device 100 transmits the first ranging signal as described above with reference to FIG. 7. When the first ranging signal is received, the master of the communication unit 200 transmits the second ranging signal. When the second ranging signal is received, the portable device 100 transmits a signal that serves as both the third ranging signal and the angle estimation signal. Next, each of the plurality of wireless communication sections 210 receives the signal that serves as both the third ranging signal and the angle estimation signal. Each of the portable device 100 and the communication unit 200 detects the first incoming waves from respective signals received through the position estimation communication. In addition, the control unit 200 may measure a time period T3 from reception time of the first ranging signal to transmission time of the second ranging signal, and a time period T4 from transmission time of the second ranging signal to reception time of the third ranging signal. In addition, the portable device 100 may measure a time period $T_1$ from transmission time of the first ranging signal to reception time of the second ranging signal, and a time period $T_2$ from reception time of the second ranging signal to transmission time of the third ranging signal, and then transmit a signal including the time period $T_1$ and time period $T_2$.

Next, the communication unit 200 calculates the first parameter belonging to the reliability parameter, on the basis of the first incoming wave obtained through the position estimation communication (Step S304). For example, the communication unit 200 calculates any of the first reliability parameter to the eighth reliability parameter, as the first parameter.

Next, the communication unit 200 determines whether or not the number of first incoming waves that meet the reliability standard has reached the first predetermined number (=1), that is, whether or not a first incoming wave that meets the reliability standard has been obtained (Step S306).

In the case where it is determined that the first incoming wave that meets the reliability standard has not been obtained in Step S306 (NO in Step S306), the communication unit 200 determines whether or not to change the master on the basis of the second parameter belonging to the reliability parameter, which has been calculated with regard to the master (Step S308). For example, the communication unit 200 determines to change the master if the second parameter is calculated with regard to the master and the second parameter indicates lower reliability than a predetermined threshold. IF not, the communication unit 200 determines not to change the master.

Note that, it is also possible for the communication unit 200 to use the first parameter calculated in Step S304, as the second parameter. Alternatively, the communication unit 200 may calculate any of the first reliability parameter to the seventh reliability parameter, as the second parameter separately from the first parameter.

In the case where the communication unit 200 has determined to change the master (YES in Step S308), the communication unit 200 selects a master on the basis of the second parameter (Step S310). For example, the communication unit 200 selects, as the maser, a wireless communication section 210 for which a second parameter indicating the highest reliability is calculated, from among the respective second parameters calculated with regard to the plurality of wireless communication sections 210. Next, the process returns to Step S302.

On the other hand, in the case where the communication unit 200 has determined not to change the master (NO in Step S308), the process returns to Step S302.

In the case where it is determined that the first incoming wave that meets the reliability standard has been obtained in Step S306 (YES in Step S306), the communication unit 200 determines the positional parameter of the portable device 100 on the basis of the first incoming wave that meets the reliability standard (Step S312).

(2) Second Example

Figure 20:
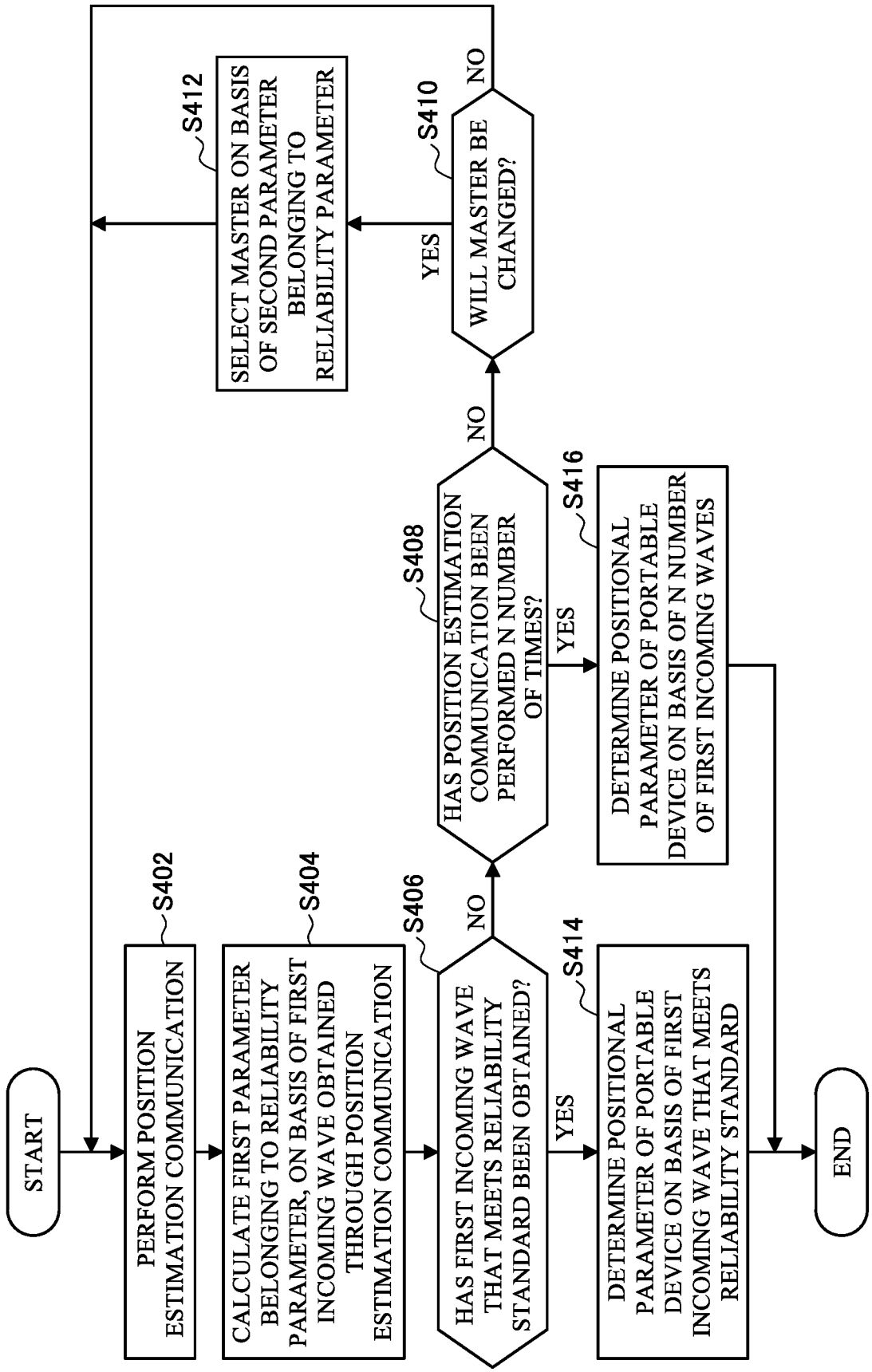
FIG. 20 is a flowchart illustrating an example of a flow of a process performed by the communication unit of the vehicle according to the embodiment.

FIG. 20 is a flowchart illustrating an example of a flow of a process performed by the communication unit 200 of the vehicle 202 according to the present embodiment. According to this flowchart, it is assumed that position estimation communication is performed one time in the single measurement process, the first predetermined number is one, and the second predetermined number is N (N>1).

As illustrated in FIG. 20, the communication unit 200 first performs the position estimation communication (Step S402).

Next, the communication unit 200 calculates the first parameter belonging to the reliability parameter, on the basis of the first incoming waves obtained through the position estimation communication (Step S404). For example, the communication unit 200 calculates any of the first reliability parameter to the eighth reliability parameter, as the first parameter.

Next, the communication unit 200 determines whether or not the number of first incoming waves that meet the reliability standard has reached the first predetermined number (=1), that is, whether or not a first incoming wave that meets the reliability standard has been obtained (Step S406).

In the case where it is determined that the first incoming wave that meets the reliability standard has not been obtained (NO in Step S406), the communication unit 200 determines whether or not the position estimation communication has been performed N number of times (Step S408).

In the case where it is determined that the position estimation communication has not been performed N number of times (NO in Step S408), the communication unit 200 determines whether or not to change the master on the basis of the second parameter belonging to the reliability parameter, which has been calculated with regard to the master (Step S410). For example, the communication unit 200 determines to change the master if the second parameter is calculated with regard to the master and the second parameter indicates lower reliability than a predetermined threshold. IF not, the communication unit 200 determines not to change the master.

Note that, it is also possible for the communication unit 200 to use the first parameter calculated in Step S404, as the second parameter. Alternatively, the communication unit 200 may calculate any of the first reliability parameter to the seventh reliability parameter, as the second parameter separately from the first parameter.

In the case where the communication unit 200 has determined to change the master (YES in Step S410), the communication unit 200 selects a master on the basis of the second parameter (Step S412). For example, the communication unit 200 selects, as the maser, a wireless communication section 210 for which a second parameter indicating the highest reliability is calculated, from among the respective second parameters calculated with regard to the plurality of wireless communication sections 210. Next, the process returns to Step S402.

On the other hand, in the case where the communication unit 200 has determined not to change the master (NO in Step S410), the process returns to Step S402.

In the case where it is determined that the first incoming wave that meets the reliability standard has been obtained in Step S406 (YES in Step S406), the communication unit 200 determines the positional parameter of the portable device 100 on the basis of the first incoming wave that meets the reliability standard (Step S414).

In addition, in the case where it is determined that the position estimation communication has been performed N number of times in Step S408 (YES in Step S408), the communication unit 200 determines the positional parameter of the portable device 100 on the basis of N number of first incoming waves obtained through the position estimation communication performed N number of times (Step S416).

Note that, it is also possible to end the process without determining the positional parameter in Step S416.

(3) Third Example

Figure 21:
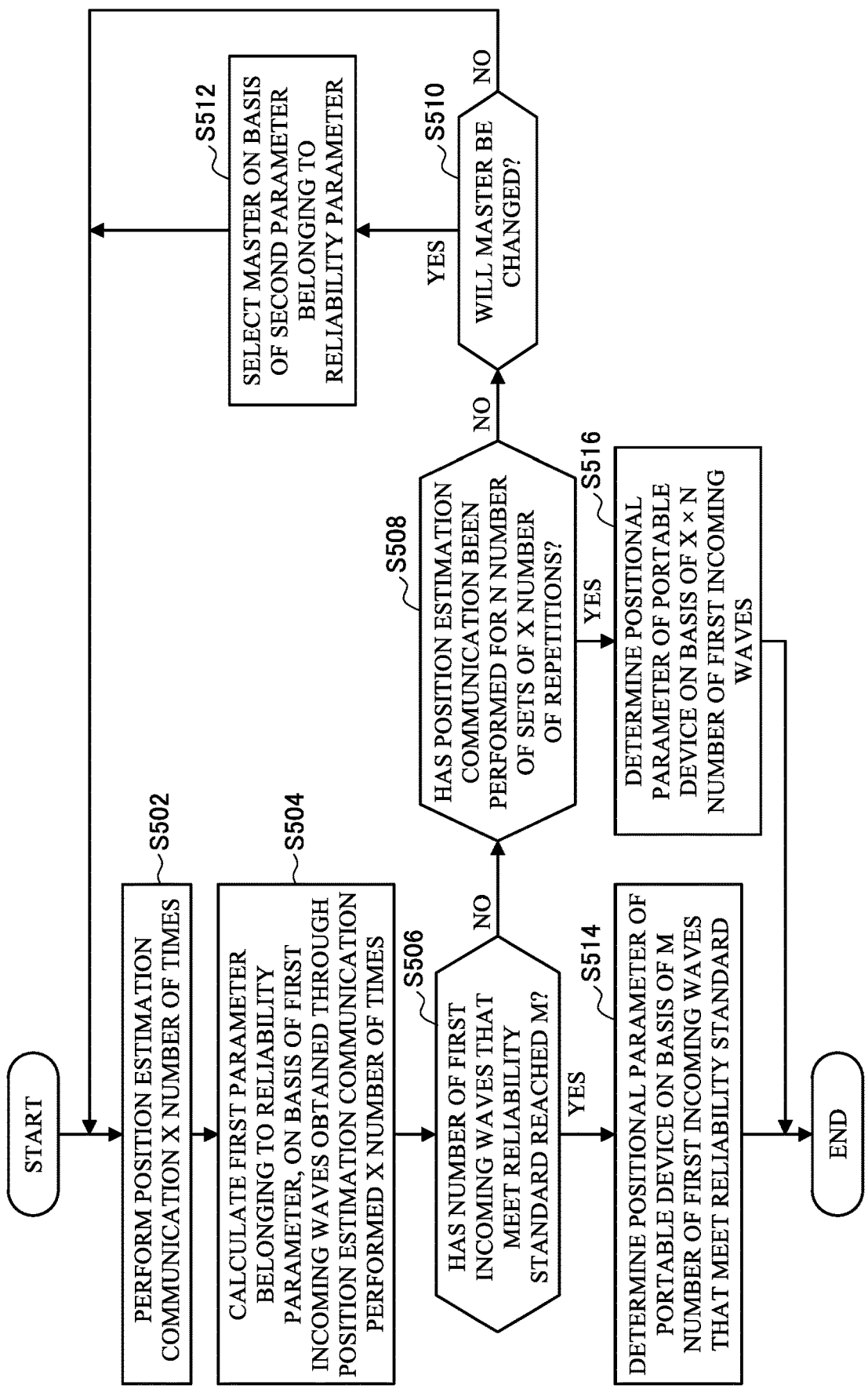
FIG. 21 is a flowchart illustrating an example of a flow of a process performed by the communication unit of the vehicle according to the embodiment.

FIG. 21 is a flowchart illustrating an example of a flow of a process performed by the communication unit 200 of the vehicle 202 according to the present embodiment. According to this flowchart, it is assumed that position estimation communication is performed X number of times (X>1) in the single measurement process, the first predetermined number is M (M>1), and the second predetermined number is N (N>1).

As illustrated in FIG. 21, the communication unit 200 first performs the position estimation communication X number of times (Step S502).

Next, the communication unit 200 calculates the first parameter belonging to the reliability parameter, on the basis of X number of first incoming waves obtained through the position estimation communication performed X number of times (Step S504). For example, the communication unit 200 calculates the ninth reliability parameter as the first parameter.

Next, the communication unit 200 determines whether or not the number of first incoming waves that meet the reliability standard has reached M (Step S506).

In the case where it is determined that the number of first incoming waves that meet the reliability standard has not reached M (NO in Step S506), the communication unit 200 determines whether or not the position estimation communication has been performed for N number of sets of X number of repetitions (Step S508).

In the case where it is determined that the position estimation communication has not been performed for N number of sets of X number of repetitions (NO in Step S508), the communication unit 200 determines whether or not to change the master on the basis of the second parameter belonging to the reliability parameter, which has been calculated with regard to the master (Step S510). For example, the communication unit 200 determines to change the master if the second parameter is calculated with regard to the master and the second parameter indicates lower reliability than a predetermined threshold. IF not, the communication unit 200 determines not to change the master.

Note that, the communication unit 200 calculates any of the first reliability parameter to the seventh reliability parameter, as the second parameter separately from the first parameter.

In the case where the communication unit 200 has determined to change the master (YES in Step S510), the communication unit 200 selects a master on the basis of the second parameter (Step S512). For example, the communication unit 200 selects, as the maser, a wireless communication section 210 for which a second parameter indicating the highest reliability is calculated, from among the respective second parameters calculated with regard to the plurality of wireless communication sections 210. Next, the process returns to Step S502.

On the other hand, in the case where the communication unit 200 has determined not to change the master (NO in Step S510), the process returns to Step S502.

In the case where it is determined that the number of first incoming waves that meet the reliability standard has reached M in Step S506 (YES in Step S506), the communication unit 200 determines the positional parameter of the portable device 100 on the basis of M number of first incoming waves that meet the reliability standard (Step S514).

In addition, in the case where it is determined that the position estimation communication has been performed for N number of sets of X number of repetitions in Step S508 (YES in Step S508), the communication unit 200 determines the positional parameter of the portable device 100 on the basis of X×N number of first incoming waves obtained through the position estimation communication performed X×N number of times (Step S516).

Note that, it is also possible to end the process without determining the positional parameter in Step S516.

5. Supplement

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

For example, it is also possible to use a combination of any two or more reliability parameters among the plurality of reliability parameters described in the above embodiment.

For example, the above embodiment has been described on the assumption that the CIR is the correlation computation result. However, present invention is not limited thereto. For example, the CIR may be the reception signal itself (complex number including IQ components). The CIR value may be may be the complex number including IQ components, which is the reception signal, the CIR value may be a phase or amplitude of the reception signal, or the CIR value may be electric power that is a sum of squares of the I component and the Q component of the reception signal (or square of amplitude). In this case, the receiver detects the first incoming wave from the reception signal. For example, the receiver may use a condition that amplitude or reception electric power of a received wireless signal exceeds a predetermined threshold for the first time, as the predetermined detection standard for detecting the first incoming wave. In this case, the receiver may detect a signal (more specifically, sampling point) having amplitude or reception electric power that exceeds the predetermined threshold for the first time, as the first incoming wave among reception signals.

For example, in the above-described embodiment, the control section 230 calculates the CIR, detects the first incoming wave (that is, specific element), and estimates the positional parameter. However, the present invention is not limited thereto. Any of the above-described processes may be performed by the wireless communication section 210. For example, each of the plurality of wireless communication sections 210 may calculate the CIR and detect the first incoming wave on the basis of the reception signal received by each of the plurality of wireless communication sections 210. In addition, the positional parameter may be estimated by the wireless communication section 210 that functions as the master.

For example, according to the above-described embodiment, the description has been given with reference to the example in which the angles α and β are calculated on the basis of antenna array phase differences between antennas in a pair. However, the present invention is not limited thereto. For example, the communication unit 200 may calculate the angles α and β through beamforming using the plurality of antennas 211. In this case, the communication unit 200 scans main lobes of the plurality of antennas 211 in all the directions, determines that the portable device 100 exists in a direction with largest reception electric power, and calculates the angles α and β on the basis of this direction.

For example, according to the above-described embodiment, as described with reference to FIG. 3, the local coordinate system has been treated as a coordinate system including coordinate axes parallel to axes connecting the antennas in the pairs. However, the present invention is not limited thereto. For example, the local coordinate system may be a coordinate system including coordinate axes that are not parallel to the axes connecting the antennas in the pairs. In addition, the origin is not limited to the center of the plurality antennas 211. The local coordinate system according to the present embodiment may be arbitrarily set on the basis of arrangement of the plurality of antennas 211 of the communication unit 200.

For example, although the example in which the portable device 100 serves as the authenticatee and the communication unit 200 serves as the authenticator has been described in the above embodiment, the present invention is not limited thereto. The roles of the portable device 100 and the communication unit 200 may be reversed. For example, the positional parameter may be estimated by the portable device 100. In addition, the roles of the portable device 100 and the communication unit 200 may be switched dynamically. In addition, a plurality of the communication units 200 may determine the positional parameters, and perform authentication.

For example, although the example in which the present invention is applied to the smart entry system has been described in the above embodiment, the present invention is not limited thereto. The present invention is applicable to any system that estimates the positional parameter and performs the authentication by transmitting/receiving signals. For example, the present invention is applicable to a pair of any two devices selected from a group including portable devices, vehicles, smartphones, drones, houses, home appliances, and the like. In this case, one in the pair operates as the authenticator, and the other in the pair operates as the authenticatee. Note that, the pair may include two device of a same type, or may include two different types of devices. In addition, the present invention is applicable to a case where a wireless local area network (LAN) router estimates a position of a smartphone.

For example, in the above embodiment, the standard using UWB has been exemplified as the wireless communication standard. However, the present invention is not limited thereto. For example, it is also possible to use a standard using infrared as the wireless communication standard.

Note that, a series of processes performed by the devices described in this specification may be achieved by any of software, hardware, and a combination of software and hardware. A program that configures software is stored in advance in, for example, a recording medium (non-transitory medium) installed inside or outside the devices. In addition, for example, when a computer executes the programs, the programs are read into random access memory (RAM), and executed by a processor such as a CPU. The recording medium may be a magnetic disk, an optical disc, a magneto-optical disc, flash memory, or the like. Alternatively, the above-described computer program may be distributed via a network without using the recording medium, for example.

Further, in the present specification, the processes described using flowcharts are not necessarily executed in the order illustrated in the drawings. Some processing steps may be executed in parallel. In addition, additional processing steps may be employed and some processing steps may be omitted.

REFERENCE SIGNS LIST 1 system
100 portable device
110 wireless communication section
111 antenna
120 storage section
130 control section
200 communication unit
202 vehicle
210 wireless communication section
211 antenna
220 storage section
230 control section

What is claimed is:

1. A communication device comprising:
a plurality of wireless communication sections, each of which is configured to be capable of wirelessly transmitting and receiving a signal to and from another communication device; and
a control section configured to:
control a repetition process of repeatedly performing a measurement process, on a basis of a first parameter calculated through the measurement process, and
control a selection process of selecting a representative wireless communication section from among the plurality of wireless communication sections each time the measurement process is repeated in the repetition process,
the measurement process including transmission of a signal from the representative wireless communication section that is a wireless communication section selected from among the plurality of wireless communication sections, reception of the signal by the plurality of wireless communication sections, and calculation of the first parameter belonging to a reliability parameter with regard to at least any of the plurality of wireless communication sections, the reliability parameter serving as an indicator that indicates whether a first incoming wave is appropriate for a processing target, the first incoming wave being a signal detected as a signal that meets a predetermined detection standard among the signals received by the plurality of wireless communication sections, wherein, in the selection process, the control section determines whether or not to change the representative wireless communication section, on a basis of a second parameter belonging to the reliability parameter calculated with regard to the representative wireless communication section.

2. The communication device according to claim 1, wherein, in the selection process, the control section selects an other wireless communication section from among the plurality of wireless communication sections for which an other second parameter indicating that the other wireless communication section is most appropriate for the processing target is calculated, as the representative wireless communication section, on a basis of a plurality of second parameters calculated with regard to the respective plurality of wireless communication sections in the case of determining to change the representative wireless communication section.

3. The communication device according to claim 1, wherein the second parameter belonging to the reliability parameter is an indicator indicating whether the first incoming wave detected with regard to one of the plurality of wireless communication sections is appropriate for the processing target.

4. The communication device according to claim 1, wherein the first parameter belonging to the reliability parameter is same as the second parameter belonging to the reliability parameter.

5. The communication device according to claim 1, wherein the control section continues the repetition process until the number of first incoming waves corresponding to the reliability parameter that meets a predetermined standard reaches a first predetermined number.

6. The communication device according to claim 5, wherein, in a case where the repetition process is stopped, the control section controls a positional parameter determination process of determining a positional parameter indicating a position of the other communication device on a basis of the first incoming wave obtained through the measurement process.

7. The communication device according to claim 6, wherein the control section determines the positional parameter on a basis of the first incoming wave corresponding to the reliability parameter that meets the predetermined standard.

8. The communication device according to claim 6, wherein, in a case where the number of repetitions of the measurement process in the repetition process reaches a second predetermined number, the control section stops the repetition process and determines the positional parameter on a basis of the first incoming waves obtained through the measurement processes in the repetition process.

9. The communication device according to claim 6, wherein, in a case where the number of repetitions of the measurement process in the repetition process reaches a second predetermined number, the control section stops the repetition process but does not determine the positional parameter in the positional parameter determination process.

10. The communication device according to claim 6, wherein the control section determines the positional parameter by applying a statistical process based on the reliability parameter, to a plurality of the positional parameters respectively estimated on a basis of a plurality of the first incoming waves.

11. The communication device according to claim 6, wherein the positional parameter includes at least any of a distance to the other communication device from the representative wireless communication section, an angle between a coordinate axis and a straight line connecting the other communication device to an origin of a first predetermined coordinate system, and coordinates of the other communication device in a second predetermined coordinate system.

12. The communication device according to claim 11, wherein
the communication device is installed in a vehicle,
the other communication device is carried by a user of the vehicle, and
the control section determines a region including the other communication device among a plurality of regions including a vehicle interior and a vehicle exterior of the vehicle, in the positional parameter determination process.

13. The communication device according to claim 1, wherein the control section receives a signal from the plurality of wireless communication sections multiple times in the single measurement process.

14. A non-transitory computer readable storage medium having a program stored therein,
the program causing a computer for controlling a communication device including a plurality of wireless communication sections, each of which is configured to be capable of wirelessly transmitting and receiving a signal to and from another communication device, to function as
a control section configured to:
control a repetition process of repeatedly performing a measurement process, on a basis of a first parameter calculated through the measurement process, and
control a selection process of selecting a representative wireless communication section from among the plurality of wireless communication sections each time the measurement process is repeated in the repetition process,
the measurement process including transmission of a signal from the representative wireless communication section that is a wireless communication section selected from among the plurality of wireless communication sections, reception of the signal by the plurality of wireless communication sections, and calculation of the first parameter belonging to a reliability parameter with regard to at least any of the plurality of wireless communication sections, the reliability parameter serving as an indicator that indicates whether a first incoming wave is appropriate for a processing target, the first incoming wave being a signal detected as a signal that meets a predetermined detection standard among the signals received by the plurality of wireless communication sections, wherein, in the selection process, the control section determines whether or not to change the representative wireless communication section, on a basis of a second parameter belonging to the reliability parameter calculated with regard to the representative wireless communication section.

\* \* \* \* \*